(12) United States Patent
Yonemoto et al.

(10) Patent No.: US 12,343,873 B2
(45) Date of Patent: Jul. 1, 2025

(54) CONTROL DEVICE, CONTROL SYSTEM, ROBOT SYSTEM, AND CONTROL METHOD

(71) Applicant: Kawasaki Jukogyo Kabushiki Kaisha, Kobe (JP)

(72) Inventors: Shingo Yonemoto, Kobe (JP); Takanori Kozuki, Kobe (JP); Masahiko Akamatsu, Kobe (JP); Hitoshi Hasunuma, Kobe (JP); Masayuki Kamon, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 489 days.

(21) Appl. No.: 17/776,602

(22) PCT Filed: Nov. 16, 2020

(86) PCT No.: PCT/JP2020/042651
§ 371 (c)(1),
(2) Date: May 13, 2022

(87) PCT Pub. No.: WO2021/095886
PCT Pub. Date: May 20, 2021

(65) Prior Publication Data
US 2022/0388160 A1 Dec. 8, 2022

(30) Foreign Application Priority Data
Nov. 15, 2019 (JP) .................................. 2019-207333

(51) Int. Cl.
B25J 9/16 (2006.01)
B25J 11/00 (2006.01)
B25J 13/08 (2006.01)

(52) U.S. Cl.
CPC ............... *B25J 9/163* (2013.01); *B25J 9/161* (2013.01); *B25J 9/1653* (2013.01); *B25J 9/1664* (2013.01);
(Continued)

(58) Field of Classification Search
CPC . B25J 9/163; B25J 9/161; B25J 9/1653; B25J 9/1664; B25J 9/1679; B25J 9/1697;
(Continued)

(56) References Cited

U.S. PATENT DOCUMENTS

2009/0259412 A1* 10/2009 Brogardh ............. G05B 19/423
702/41
2018/0195858 A1 7/2018 Nishikawa
(Continued)

FOREIGN PATENT DOCUMENTS

JP 7-246561 A 9/1995
JP 2003-311661 A 11/2003
(Continued)

*Primary Examiner* — Dalena Tran
(74) *Attorney, Agent, or Firm* — XSENSUS LLP

(57) ABSTRACT

A control device includes: first circuitry that generates a command to cause a robot to autonomously grind a grinding target portion; second circuitry that generates a command to cause the robot to grind a grinding target portion according to manipulation information from an operation device; third circuitry that controls operation of the robot according to the command; storage that stores image data of a grinding target portion and operation data of the robot corresponding to the command; and forth circuitry that performs machine learning by using image data of a grinding target portion and the operation data for the grinding target portion, receives the image data as input data, and outputs an operation correspondence command corresponding to the operation data as output data. The first circuitry generates the command, based on the operation correspondence command.

22 Claims, 13 Drawing Sheets

(52) U.S. Cl.
CPC .......... *B25J 9/1679* (2013.01); *B25J 9/1697* (2013.01); *B25J 11/0065* (2013.01); *B25J 13/085* (2013.01)

(58) Field of Classification Search
CPC .... B25J 11/0065; B25J 13/085; B25J 13/065; G05B 2219/39298; G05B 2219/40391; G05B 2219/40613; G05B 19/42; B23Q 15/00; B24B 27/00
See application file for complete search history.

(56) References Cited

U.S. PATENT DOCUMENTS

| | | |
|---|---|---|
| 2019/0291270 A1* | 9/2019 | Kiyama ............... B25J 11/0065 |
| 2020/0139539 A1 | 5/2020 | Hasunuma et al. |
| 2021/0003993 A1 | 1/2021 | Hashimoto et al. |

FOREIGN PATENT DOCUMENTS

| | | | | |
|---|---|---|---|---|
| JP | 2008-221281 A | 9/2008 | | |
| JP | 2012-206200 A | 10/2012 | | |
| JP | 2017-20874 A | 1/2017 | | |
| JP | 2018-205929 A | 12/2018 | | |
| JP | 2019-058960 A | 4/2019 | | |
| JP | 2019-162712 A1 | 9/2019 | | |
| WO | WO-2018225862 A1 * | 12/2018 | .............. | B25J 9/163 |
| WO | 2019/107455 A1 | 6/2019 | | |

* cited by examiner

CONTROL DEVICE, CONTROL SYSTEM, ROBOT SYSTEM, AND CONTROL METHOD

CROSS REFERENCE TO RELATED APPLICATIONS

This application is based on PCT filing PCT/JP2020/042651, filed Nov. 16, 2020, which claims priority to and the benefit of Japanese Patent Application No. 2019-207333 filed on Nov. 15, 2019, the entire disclosure of which is incorporated herein by reference.

TECHNICAL FIELD

The present disclosure relates to a control device, a control system, a robot system, and a control method.

BACKGROUND ART

Conventionally, a technology for switching between autonomous operation and manual operation of a robot according to a work content has been known. For example, PTL1 discloses a remote manipulation control device for a robot. The remote manipulation control device automatically shifts the robot from autonomous operation to manual operation when a difference equal to or greater than a threshold is detected between the position/posture of a target object in an environment model and the position/posture of the target object, in a work environment, which is captured by a camera. The environment model includes information on the position/posture of the target object in the work environment and positioning, in the work environment, which is required for operating the robot, etc.

CITATION LIST

Patent Literature

PTL 1: Japanese Laid-Open Patent Publication No. 2003-311661

SUMMARY OF INVENTION

In recent years, automation of robot work that does not include manual operation has been considered. However, for example, in grinding work on a welded part, a state of the welded part such as an unevenness state is not uniform. Moreover, the state of the welded part is different for each welded part and is not uniform thereamong. The content of such grinding work can change for each welded part, so that automation of such grinding work by a robot is difficult.

An object of the present disclosure is to provide a control device, a control system, a robot system, and a control method which achieve automation of grinding work using a robot.

In order to achieve the above object, a control device according to an aspect of the present disclosure is a control device for a robot that performs grinding work by using a grinding device, the control device including: an autonomous command generation unit configured to generate an autonomous operation command for causing the robot to autonomously grind a grinding target portion; a manual command generation unit configured to generate a manual operation command for causing the robot to grind a grinding target portion according to manipulation information outputted from an operation device for operating the robot; an operation control unit configured to control operation of the grinding work of the robot according to the operation command; a storage unit configured to store image data of a grinding target portion and operation data of the robot corresponding to the operation command generated for the grinding target portion in a state of the image data; and a learning unit configured to perform machine learning by using image data of a grinding target portion and the operation data for the grinding target portion in a state of the image data, receive the image data as input data, and output an operation correspondence command corresponding to the operation data as output data, wherein the autonomous command generation unit generates the autonomous operation command, based on the operation correspondence command of the learning unit.

Moreover, a control system according to an aspect of the present disclosure includes the control device according to the aspect of the present disclosure and the operation device for operating the robot.

Moreover, a robot system according to an aspect of the present disclosure includes the control device according to the aspect of the present disclosure, the robot, the operation device for operating the robot, and an imaging device, and the imaging device outputs image data obtained by taking an image of a grinding target portion, to the control device.

Moreover, a control method according to an aspect of the present disclosure includes: causing a learning model to receive image data of a grinding target portion as input data and to output an operation correspondence command for a robot as output data; generating an autonomous operation command for causing the robot to autonomously grind the grinding target portion, based on the operation correspondence command; generating a manual operation command for causing the robot to grind the grinding target portion according to manipulation information outputted from an operation device for operating the robot; controlling operation of grinding work of the robot according to the operation command; and causing the learning model to perform machine learning by using the image data of the grinding target portion and operation data of the robot corresponding to the operation command generated for the grinding target portion in a state of the image data, and the operation correspondence command outputted by the learning model is a command corresponding to the operation data of the robot.

According to the technology of the present disclosure, it is possible to automate grinding work using a robot.

DESCRIPTION OF EMBODIMENTS

Figure 1:
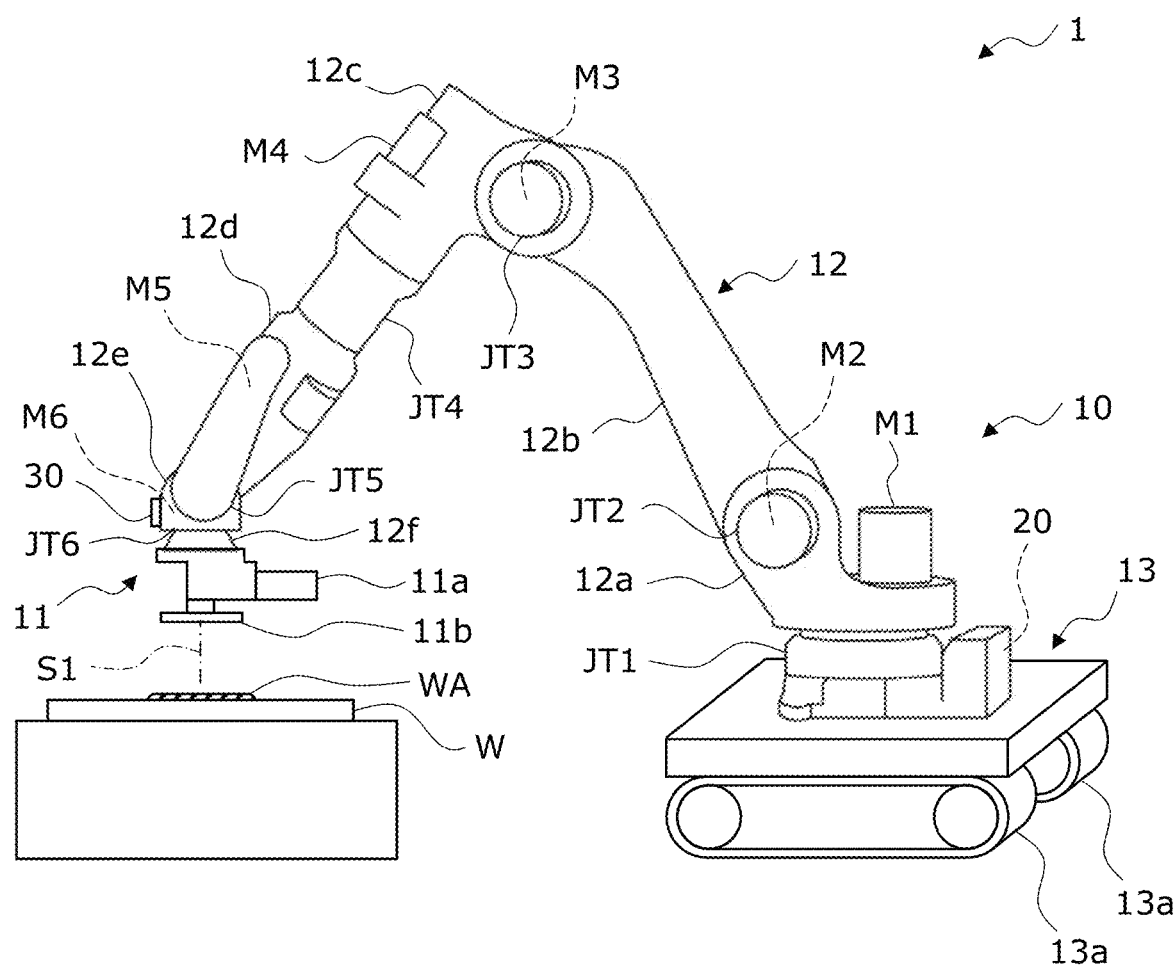
FIG. 1 is a schematic diagram showing an example of a robot system according to an embodiment.
Figure 1:
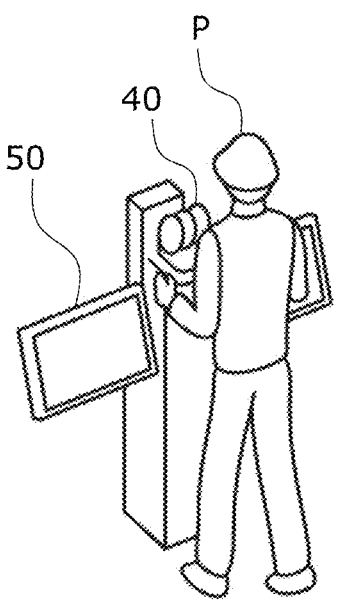

First, examples of aspects of the present disclosure will be described. A control device according to an aspect of the present disclosure is a control device for a robot that performs grinding work by using a grinding device, the control device including: an autonomous command generation unit configured to generate an autonomous operation command for causing the robot to autonomously grind a grinding target portion; a manual command generation unit configured to generate a manual operation command for causing the robot to grind a grinding target portion according to manipulation information outputted from an operation device for operating the robot; an operation control unit configured to control operation of the grinding work of the robot according to the operation command; a storage unit configured to store image data of a grinding target portion and operation data of the robot corresponding to the operation command generated for the grinding target portion in a state of the image data; and a learning unit configured to perform machine learning by using image data of a grinding target portion and the operation data for the grinding target portion in a state of the image data, receive the image data as input data, and output an operation correspondence command corresponding to the operation data as output data, wherein the autonomous command generation unit generates the autonomous operation command, based on the operation correspondence command of the learning unit.

According to the above aspect, the learning unit performs machine learning by using, as learning data, the image data of the grinding target portion and the operation data of the robot corresponding to the operation command for the grinding target portion in the state of the image data. Accordingly, the learning unit can perform machine learning by using appropriate operation data of the robot according to the states of various grinding target portions represented by image data. When image data of a grinding target portion is inputted to such a learning unit, the learning unit outputs an operation correspondence command corresponding to appropriate operation data according to the state of the grinding target portion. The autonomous command generation unit can generate an autonomous operation command having improved grinding accuracy, based on the operation correspondence command outputted by the learning unit as described above. Therefore, the control device allows grinding work using the robot to be automated, and further can improve the accuracy of the automated grinding work.

In the control device according to the aspect of the present disclosure, the learning unit may perform machine learning by using image data of a grinding target portion and the operation data corresponding to the manual operation command generated for the grinding target portion in a state of the image data.

According to the above aspect, the learning unit can perform machine learning by using operation data in which a skilled grinding work technique of a user who is an operator of the robot is reflected. In the operation correspondence command outputted by such a learning unit, an appropriate grinding work technique for the state of the grinding target portion represented by input image data can be reflected. The autonomous command generation unit can generate an autonomous operation command with higher grinding accuracy in which a skilled grinding work technique is reflected, based on the operation correspondence command described above.

In the control device according to the aspect of the present disclosure, the learning unit may perform machine learning by using image data of a grinding target portion and the operation data corresponding to the autonomous operation command and the manual operation command that are generated for the grinding target portion in a state of the image data.

According to the above aspect, when the robot executes autonomous operation and manual operation on the grinding target portion, the learning unit can perform machine learning by using the operation data corresponding to the autonomous operation command and the manual operation command for the grinding target portion.

In the control device according to the aspect of the present disclosure, during operation of the robot according to the autonomous operation command, the manual command generation unit may receive input of correction manipulation information that is the manipulation information for correcting the operation of the robot, via the operation device, and may generate a correction manual operation command that is the manual operation command, according to the correction manipulation information, and the learning unit may perform machine learning by using the image data of the grinding target portion and the operation data corresponding to the autonomous operation command and the correction manual operation command that are generated for the grinding target portion in the state of the image data.

According to the above aspect, when correction by manual operation is added to autonomous operation of the robot, the learning unit can perform machine learning by using the operation data corresponding to the autonomous operation command and the correction manual operation command. Therefore, the autonomous command generation unit can generate an autonomous operation command in which correction for operation in autonomous operation is reflected.

In the control device according to the aspect of the present disclosure, the autonomous command generation unit may generate a first autonomous operation command that is the autonomous operation command for first grinding work in which the robot autonomously grinds a grinding target portion according to a predetermined operation procedure, and a second autonomous operation command that is the autonomous operation command for second grinding work in which the robot autonomously grinds the grinding target portion, based on the operation correspondence command of the learning unit after the first grinding work, and the autonomous command generation unit may generate the second autonomous operation command, based on the operation correspondence command outputted by the learning unit with image data of the grinding target portion as input data.

According to the above aspect, the second grinding work enables grinding work corresponding to the state of a grinding target portion after the first grinding work. For example, the second grinding work can be applied to grinding for repair or finish on a grinding target portion after the first grinding work. Therefore, it is possible to improve the result of the grinding target portion. In addition, the quantity of grinding processing in the second grinding work after the first grinding work can be reduced, so that it is possible to reduce the quantity of processing of the learning unit. Therefore, it is possible to reduce the time required for the grinding work.

In the control device according to the aspect of the present disclosure, the autonomous command generation unit may generate a third autonomous operation command that is the autonomous operation command for third grinding work in which an unground grinding target portion is autonomously ground, and the autonomous command generation unit may generate the third autonomous operation command, based on the operation correspondence command outputted by the learning unit with image data of the grinding target portion as input data.

According to the above aspect, the third grinding work enables grinding work corresponding to the state of an unground grinding target portion. For example, the third grinding work can be applied to grinding for rough cutting to finish cutting on a grinding target portion. The unground grinding target portion may be a completely unground grinding target portion or a slightly ground grinding target portion. For example, the unground grinding target portion may be a grinding target portion that has not been ground by the robot through autonomous operation.

In the control device according to the aspect of the present disclosure, the learning unit may perform machine learning and input/output by using a learning model including a neural network.

According to the above aspect, the learning model including the neural network enables flexible and highly accurate processing. Therefore, the learning unit can output highly accurate output data with respect to various kinds of input data.

In the control device according to the aspect of the present disclosure, the learning unit may use data representing three-dimensional positions of various portions on a grinding target portion, as the image data.

According to the above aspect, the accuracy of the state of the grinding target portion represented in machine learning in the learning unit and the image data as input data is improved. For example, the image data can represent the three-dimensional shape such as the uneven shape of the grinding target portion. Accordingly, the accuracy of machine learning in the learning unit is improved. Therefore, the autonomous command generation unit can generate an autonomous operation command with higher grinding accuracy in terms of the result of grinding, etc.

The control device according to the aspect of the present disclosure may further include a first image processing unit configured to detect three-dimensional positions of various portions on a grinding target portion by processing an image of the grinding target portion, and to generate the image data representing the three-dimensional positions of said various portions.

According to the above aspect, the control device can generate image data representing the three-dimensional positions of various portions on the grinding target portion.

The control device according to the aspect of the present disclosure may further include a first image processing unit configured to, based on at least either one of a shade or a hue represented in an image of the grinding target portion taken by using an imaging device including a non-reflective light source and a camera, detect a distance from the camera to various positions on the grinding target portion, and to generate the image data representing the distance to said various positions.

According to the above aspect, the imaging device can take an image in which shading, reflection, halation, metallic luster, etc. are suppressed. The shade and the hue represented in such an image can represent the state such as unevenness of the grinding target portion. The first image processing unit can detect the distances from the camera to various positions on the grinding target portion by processing the above image of the grinding target portion.

The control device according to the aspect of the present disclosure may further include an imaging control unit configured to control operation of an imaging device that takes an image of a grinding target portion, and to acquire image data of the grinding target portion, the imaging control unit may cause the imaging device to take an image of a grinding target portion at a timing before grinding work on the grinding target portion and a predetermined timing during the grinding work, and the learning unit may output the operation correspondence command with the image data acquired by the imaging control unit as input data.

According to the above aspect, the learning unit can output an operation correspondence command corresponding to the state of the grinding target portion at a timing before the grinding work and a predetermined timing during the grinding work. The autonomous command generation unit can generate an autonomous operation command corresponding to the progress of the grinding work.

In the control device according to the aspect of the present disclosure, the operation control unit may cause the robot to grind all grinding target portions of a grinding target group including the grinding target portions according to the autonomous operation command, the imaging control unit may cause the imaging device to take images of said all grinding target portions after grinding work according to the autonomous operation command on said all grinding target portions is completed, and the control device may cause a presentation device to present the images of said all grinding target portions.

According to the above aspect, the user is allowed to visually recognize and compare the states of the grinding target portions after grinding. Therefore, the user is allowed to easily determine the results of grinding on the grinding target portions and to determine whether or not additional grinding is required.

The control device according to the aspect of the present disclosure may further include a second image processing unit, and the second image processing unit may process image data of a grinding target portion taken by the imaging device, may generate image data representing a three-dimensional shape of the grinding target portion by using at least either one of a color, a pattern, or a shade, and may cause the presentation device to present the image data.

According to the above aspect, the control device can present an image in which the state of the grinding target portion is easily recognized, to the user.

The control device according to the aspect of the present disclosure may further include a movement control unit configured to control operation of a moving device that moves the robot, and the movement control unit may cause the moving device to move the robot such that the robot grinds grinding target sections into which grinding target portions are divided, in a predetermined order.

According to the above aspect, the control device enables efficient grinding work in which the number of times the robot is moved is reduced, by causing the robot to perform grinding work while moving the robot for each grinding target section. For example, the range of one grinding target section may be within the reach of a robot arm of the robot being in stationary state. Accordingly, efficient movement of the robot is enabled.

The control device according to the aspect of the present disclosure may be configured to: receive, from a force sensor that detects a grinding reaction force that is a reaction force received by the grinding device, information on the grinding reaction force; and cause the operation device to generate, as a manipulation reaction force that is a reaction force with respect to a manipulation inputted to the operation device, the manipulation reaction force corresponding to the grinding reaction force.

According to the above aspect, the control device allows the user who operates the operation device, to experience the reaction force received by the grinding device from the grinding target portion or the like. For example, the user is allowed to feel the state of the grinding device which differs depending on the surface state of the grinding target portion. Therefore, force sense control of the grinding device is enabled.

The control device according to the aspect of the present disclosure may be configured to cause the operation device to generate the manipulation reaction force corresponding to the grinding reaction force acquired via a filter that removes a high-frequency component of the grinding reaction force detected by the force sensor.

According to the above aspect, the control device allows the user who operates the operation device, to experience the reaction force received by the grinding device in a state where the vibration of the grinding device is removed. Accordingly, transmission of vibration to the user is suppressed, so that accurate manipulation of the operation device by the user becomes possible, and the fatigue of the user due to vibration is suppressed.

In the control device according to the aspect of the present disclosure, the manipulation information may include commands of a position, a posture, and a force inputted to the operation device, and the manual command generation unit may generate the manual operation command including commands of a position, a posture, and an action force of the grinding device that are increased from the commands of the position, the posture, and the force included in the manipulation information.

According to the above aspect, the control device controls the grinding device with the change in position, the change in posture, and the magnitude of the action force which are increased from the change in position, the change in posture, and the magnitude of the force that are inputted to the operation device. Accordingly, larger input to the operation device becomes unnecessary, so that manipulation to be performed by the user becomes easier. For example, the user is allowed to freely control the grinding device via the robot by manipulating the operation device while maintaining user's own posture.

The control device according to the aspect of the present disclosure may be configured to determine a first coordinate system relationship that is a relationship between a robot coordinate system set for the robot and an object coordinate system set for the grinding target portion, and determine a second coordinate system relationship that is a relationship between a manipulation coordinate system set for the operation device and the object coordinate system, the manual command generation unit may generate the manual operation command according to the manipulation information, the first coordinate system relationship, and the second coordinate system relationship, and the control device may be configured to, when the object coordinate system is moved, newly determine the first coordinate system relationship after movement, based on the object coordinate system after movement and the robot coordinate system, and determine a relationship that is the same as the second coordinate system relationship before movement, as the second coordinate system relationship after movement between the object coordinate system after movement and the master coordinate system.

According to the above aspect, when the object coordinate system is moved in response to a factor such as a change in the position of the grinding target portion, the relative position between the robot and the grinding target portion is changed, so that the control device changes the first coordinate system relationship. However, the control device maintains the second coordinate system relationship as it is before movement. For example, before the object coordinate system is moved, when manipulation information for commanding movement in a first direction of the manipulation coordinate system is inputted to the operation device, the control device outputs an operation command to move the grinding device in a second direction of the object coordinate system. After the object coordinate system is moved, when manipulation information for commanding movement in the first direction of the manipulation coordinate system is inputted to the operation device, the control device outputs an operation command to move the grinding device in the second direction of the object coordinate system. Therefore, when the same manipulation is inputted before and after movement, the control device does not change the operation of the grinding device with respect to the object coordinate system before and after movement. Therefore, even when the object coordinate system is moved, the operator does not have to change a manipulation to be inputted to the operation device according to the movement of the object coordinate system, and is allowed to easily manipulate the operation device.

A control system according to an aspect of the present disclosure includes the control device according to the aspect of the present disclosure and the operation device for operating the robot. According to the above aspect, the same effects as those of the control device according to the aspect of the present disclosure are achieved.

A robot system according to an aspect of the present disclosure includes the control device according to the aspect of the present disclosure, the robot, the operation device for operating the robot, and an imaging device, and the imaging device is configured to output image data obtained by taking an image of a grinding target portion, to the control device. According to the above aspect, the same effects as those of the control device according to the aspect of the present disclosure are achieved.

The robot system according to the aspect of the present disclosure may further include a presentation device, and the presentation device may be configured to present at least either an image taken by the imaging device or an image outputted from the control device, to a user of the robot system.

According to the above aspect, the robot system allows the user to visually recognize the state of the grinding target portion before grinding work, during grinding work, and after grinding work. Accordingly, the user is allowed to visually recognize the grinding target portion even when the user is positioned away from the grinding target portion.

A control method according to an aspect of the present disclosure includes: causing a learning model to receive image data of a grinding target portion as input data and to output an operation correspondence command for a robot as output data; generating an autonomous operation command for causing the robot to autonomously grind the grinding target portion, based on the operation correspondence command; generating a manual operation command for causing the robot to grind the grinding target portion according to manipulation information outputted from an operation device for operating the robot; controlling operation of grinding work of the robot according to the operation command; and causing the learning model to perform machine learning by using the image data of the grinding target portion and operation data of the robot corresponding to the operation command generated for the grinding target portion in a state of the image data, and the operation correspondence command outputted by the learning model is a command corresponding to the operation data of the robot. According to the above aspect, the same effects as those of the control device according to the aspect of the present disclosure are achieved.

Embodiments

Hereinafter, embodiments of the present disclosure will be described with reference to the drawings. The embodiments described below are all comprehensive or specific examples. In addition, among the components in the following embodiments, the components not described in the independent claims which represent broadest concepts are described as optional components. Moreover, each figure in the accompanying drawings is a schematic view and is not necessarily exactly illustrated. Furthermore, in each figure, substantially the same components are designated by the same reference signs, and the repetitive description thereof may be omitted or simplified. Moreover, in the present description and claims, the "device" may mean not only one device but also a system including devices.

[Configuration of Robot System]

Figure 2:
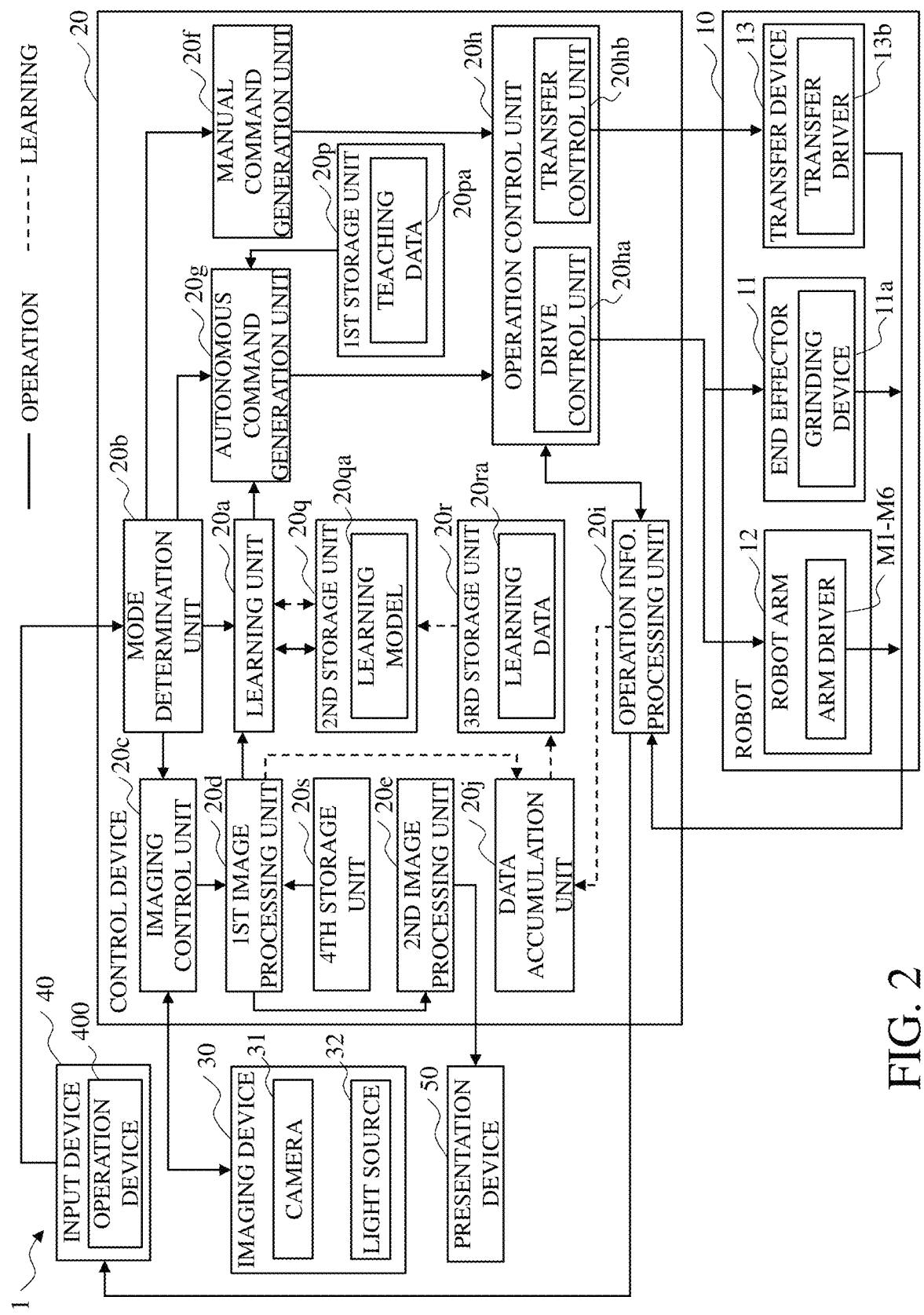
FIG. 2 is a block diagram showing an example of the functional configuration of the robot system according to the embodiment.

The configuration of a robot system 1 according to an embodiment will be described. FIG. 1 is a schematic diagram showing an example of the robot system 1 according to the embodiment. FIG. 2 is a block diagram showing an example of the functional configuration of the robot system 1 according to the embodiment. In FIG. 2, a solid arrow indicates the flow of a command, data, information, etc., for operating a robot 10 of the robot system 1, and a dashed arrow indicates the flow of a command, data, information, etc., for a control device 20 of the robot system 1 to perform machine learning.

As shown in FIG. 1, the robot system 1 according to the embodiment includes a robot 10, a control device 20, an imaging device 30, an input device 40, and a presentation device 50. The control device 20 controls the operation of the entire robot system 1. In the present embodiment, the robot 10 is an industrial robot. The robot 10 includes an end effector 11 which applies an action to an object to be processed, a robot arm 12 which moves the end effector 11 so as to execute the action, and a transfer device 13 which moves the robot 10 so as to change the position of the robot 10. The end effector 11 includes a grinding device 11a which grinds the object, and is attached to a distal end of the robot arm 12. The transfer device 13 is equipped with the robot arm 12.

In the present description and the claims, the "grinding" may include cutting that is processing of removing an unnecessary portion of an object, thereby making the object to have required dimensions, shape, etc., grinding that is processing of scraping the surface of an object, thereby making the object to have required dimensions, shape, surface roughness, etc., and polishing that is processing of smoothing the surface of an object.

Examples of the grinding device 11a include, but are not limited to, grinding devices using electric power or air pressure as a power source such as a grinder, an orbital sander, a random orbital sander, a delta sander, and a belt sander. The grinder may be a grinder of a type that rotates a disk-shaped grinding stone, a type that rotates a conical or columnar grinding stone, or the like.

In the present embodiment, the "grinding" is processing of scraping off an unnecessary portion in a grinding target region WA of a metal object W to smooth the surface of the grinding target region WA, the grinding device 11a is an electric disk grinder including a disk-shaped grinding stone 11b, and a description will be given below. Examples of the unnecessary portion in the grinding target region WA include welding marks such as a welding bead of the object W. By the rotating grinding stone 11b being pressed against a welding mark or the like in the grinding target region WA, the grinding device 11a grinds the welding mark and a portion therearound.

The robot arm 12 is not particularly limited as long as the robot arm 12 has a configuration capable of changing the position and/or the posture of the grinding device 11a at the distal end thereof. However, in the present embodiment, the robot arm 12 is a vertical articulated robot arm. The robot arm 12 may be configured as, for example, a horizontal articulated robot arm, a polar coordinate robot arm, a cylindrical coordinate robot arm, a Cartesian coordinate robot, or another type of robot arm.

The robot arm 12 includes links 12a to 12f which are sequentially disposed from a proximal portion thereof toward the distal end thereof, joints JT1 to JT6 which sequentially and rotatably connect the links 12a to 12f, and arm drivers M1 to M6 which rotationally drive the joints JT1 to JT6, respectively. The link 12a is attached to the transfer device 13 via the joint JT1. A distal end portion of the link 12f forms a mechanical interface and is connected to the end effector 11. The operation of the arm drivers M1 to M6 is controlled by the control device 20. Each of the arm drivers M1 to M6 uses electric power as a power source and has a servomotor as an electric motor which drives the arm driver, but is not limited thereto. The number of joints of the robot arm 12 is not limited to six, and may be seven or more, or may be one or more and five or less.

The transfer device 13 includes traveling devices 13a and a transfer driver 13b (see FIG. 2) which drives the traveling devices 13a, and is capable of moving the robot 10 on a floor surface or the like. In the present embodiment, each traveling device 13a is a crawler, but may be another traveling device such as a traveling device that drives a wheel and a traveling device that runs on a track. The transfer driver 13b uses electric power as a power source and has servomotors as an electric motor, but is not limited thereto. The transfer device 13 is an example of a moving device.

Figure 3:
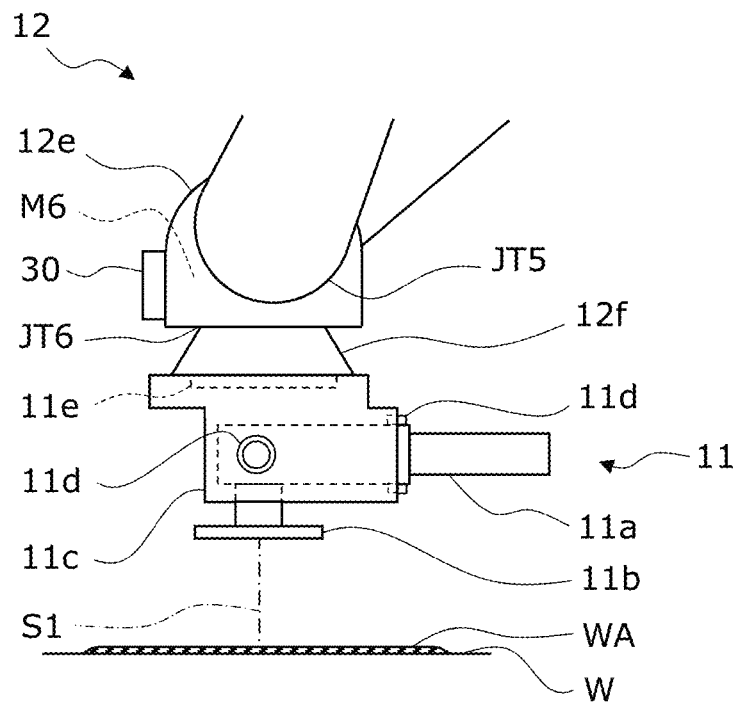
FIG. 3 is a side view showing an example of the configuration of an end effector according to the embodiment.

FIG. 3 is a side view showing an example of the configuration of the end effector 11 according to the embodiment. As shown in FIG. 3, the end effector 11 includes the grinding device 11a, the grinding stone 11b, an attachment tool 11c, cushioning members 11d, and a force sensor 11e. The attachment tool 11c is configured to support the grinding device 11a and be connected to the link 12f, and attaches the grinding device 11a to the link 12f. The cushioning members 11d are disposed so as to be interposed between the attachment tool 11c and the grinding device 11a, and the attachment tool 11c supports the grinding device 11a via the cushioning members 11d. The cushioning members 11d damp or reduce vibration and impact transmitted from the grinding device 11a to the attachment tool 11c. For example, each cushioning member 11d is composed of a vibration damping material that damps vibration and impact, or a vibration-proof material that reduces vibration and impact. The material forming each cushioning member 11d may be a material having elasticity or flexibility, and may be, for example, rubber or a resin such as a polymer material.

The force sensor 11e is disposed between the attachment tool 11c and the link 12f, and detects a reaction force which is a force acting on the link 12f from the attachment tool 11c, and outputs the reaction force to the control device 20. The reaction force is a force received by the grinding device 11a from the object W during grinding work. In the present embodiment, the force sensor 11e detects six axial forces, that is, forces in the directions of three orthogonal axes and moments which are rotational forces around the three axes, but is not limited thereto. For example, the force sensor 11e may detect only forces in the direction of one axis, two axes, or three axes. For example, one of the three axes may be the same as a twisting rotation axis S1 of the link 12f.

As shown in FIG. 1 and FIG. 2, the imaging device 30 is disposed at the link 12e of the robot arm 12. The imaging device 30 includes a camera 31 which takes an image of the grinding target region WA of the object W, and a light source 32 which illuminates the grinding target region WA. The camera 31 and the light source 32 are directed along the axial direction of the twisting rotation axis S1 and toward the end effector 11, and can take an image of the grinding target region WA and a portion therearound and can illuminate the grinding target region WA and the portion therearound, respectively. The positions of the camera 31 and the light source 32 may be any positions as long as the camera 31 and the light source 32 can take an image of the grinding target region WA and can illuminate the grinding target region WA, respectively. The positions of the camera 31 and the light source 32 may be positions on the robot arm 12 other than the link 12e, or positions outside the robot arm 12. The camera 31 and the light source 32 perform imaging operation and illumination operation, respectively, according to a command from the control device 20. The camera 31 sends a signal and the like of a taken image to the control device 20.

The camera 31 is a camera that takes an image for detecting a three-dimensional position, which is the position of a subject in a three-dimensional space with respect to the camera 31, such as the distance to the subject, or the like. For example, the camera 31 is a camera that takes a digital image, and may have a configuration as a stereo camera, a monocular camera, a time-of-flight-camera (TOF camera), a pattern light projection camera such a fringe projection camera, a camera using an optical cutting method, or the like. In the present embodiment, the camera 31 is a stereo camera.

Examples of the light source 32 include a light emitting diode (LED), a strobe, and the like. In the present embodiment, the light source 32 is dome lighting or flat dome lighting using an LED. Both the dome lighting and the flat dome lighting can irradiate the surface of the object W with diffused light and suppress reflected light on the surface. Accordingly, in an image taken by the camera 31, halation, shading, etc., on a curved surface and unevenness of the surface of the object W are suppressed, and the surface shape such as the uneven shape of the surface can be visually and accurately represented. In the dome lighting, the LED emits light inside a dome-shaped reflector, and the reflected light reflected and diffused by the reflector illuminates the object W. In the flat dome lighting, the LED emits light through the edge of a light guide plate into the light guide plate, and the light is diffused in the process of passing through the light guide plate and then emitted from the light guide plate to irradiate the object W. The light source 32 may be other lighting capable of irradiation with diffused light. The light source 32 is an example of a non-reflective light source.

The input device 40 receives input of commands, data, information, etc., by a user P who manages the robot system 1, and outputs the commands, the data, the information, etc., to the control device 20. The input device 40 is connected to the control device 20 via wired communication, wireless communication, or a combination thereof. The types of wired communication and wireless communication may be any types. For example, the input device 40 receives a command to designate an operation mode to be executed by the robot 10. In addition, the input device 40 includes an operation device 400, receives input for manipulating the robot 10 by manual operation, via the operation device 400, and outputs manipulation information, which is information corresponding to the input, to the control device 20. Moreover, the input device 40 receives input of information on an object to be ground, information on a grinding target region, etc. The information on the grinding target region may include information such as the quantity, position, shape, and dimensions of the grinding target region.

Figure 4:
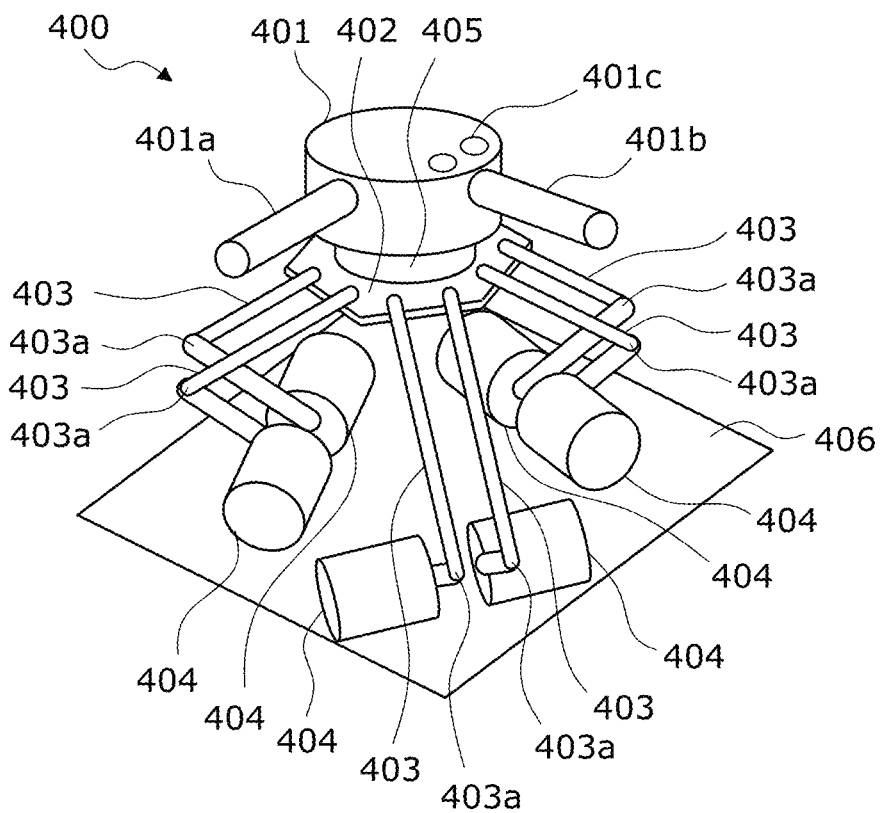
FIG. 4 is a perspective view showing an example of the configuration of an operation device according to the embodiment.

FIG. 4 is a perspective view showing an example of the configuration of the operation device 400 according to the embodiment. As shown in FIG. 4, the operation device 400 includes a grip unit 401, a support 402, arms 403, motors 404, and a force sensor 405.

The grip unit 401 is configured to be able to be grasped by the user P who is an operator. In the present embodiment, the grip unit 401 has a shape similar to that of the grinder which is the grinding device 11a, but is not limited thereto. The grip unit 401 includes two handle portions 401a and 401b which can be grasped by the user P. The user P manipulates the robot 10 to perform grinding operation by moving the grip unit 401 while grasping the handle portions 401a and 401b as if actually grasping the grinding device 11a and performing grinding. In addition, the grip unit 401 includes input portions 401c such as push buttons for operation on the grinding device 11a and the like.

The support 402 supports the grip unit 401. The force sensor 405 is disposed between the grip unit 401 and the support 402, and detects a force acting therebetween. Specifically, the force sensor 405 detects six axial forces, that is, forces in the directions of three orthogonal axes and moments which are rotational forces around the three axes. For example, one of the three axes may be an axis extending from the grip unit 401 toward the support 402.

The support 402 is movably supported by six arms 403. The six arms 403 consist of three pairs. The three pairs of the arms 403 extend radially in three directions from the support 402. Each arm 403 has a joint 403a, and is bendable about the joint 403a. One end of each arm 403 is connected to the support 402 via a universal joint such as a ball joint so as to be rotatable about three orthogonal axes. The other end of each arm 403 is connected to a rotation shaft of the motor 404, which is disposed on a support base 406 located below the support 402, via a reducer or the like (not shown). The joint 403a of each arm 403 connects two columnar members included in the arm 403 via a universal joint such as a ball joint such that the columnar members are rotatable about three orthogonal axes.

Six motors 404 are disposed on the support base 406. The six motors 404 consist of three pairs. Each pair of the motors 404 are arranged such that the rotation shafts thereof are coaxial with each other, and are connected to one pair of the arms 403. The three pairs of the motors 404 are disposed such that the rotation shafts thereof form the respective sides of a triangle. Each motor 404 is composed of a servomotor or the like.

The grip unit 401 described above can take various positions and postures in a three-dimensional space. Then, in response to the position and the posture of the grip unit 401, each arm 403 operates to rotate each motor 404. The rotation amounts, that is, the rotation angles, of the six motors 404 corresponding to the position and the posture of the grip unit 401 are uniquely determined.

In the present embodiment, the control device 20 performs bilateral force sense control such that the positions, the postures, and the force states of the operation device 400 and the robot 10 correspond to each other. Each motor 404 includes a rotation sensor (not shown) such as an encoder that detects the rotation amount of the rotor of the servomotor, and a current sensor (not shown) that detects the drive current of the servomotor, but is not limited thereto. The operation device 400 outputs manipulation information including detection signals (hereinafter, also referred to as "force signals") of the six axial forces of the force sensor 405, as commands of a position, a posture, position and posture movement speeds, and a force, to the control device 20, and outputs detection signals (hereinafter, also referred to as "rotation signal" and "current signal") of the rotation sensor and the current sensor of each motor 404, as feedback information, to the control device 20. The control device 20 may use a command value of a current supplied by a drive circuit for the servomotor to the servomotor, as feedback information.

The control device 20 generates a manual operation command or the like, which will be described later, using the manipulation information. The manual operation command includes commands of a three-dimensional position, a three-dimensional posture, three-dimensional position and posture movement speeds, and a three-dimensional action force of the end effector 11 corresponding to the manipulation information. Furthermore, the control device 20 controls the output torque of each motor 404, based on data of the six axial forces indicated by the detection signals of the force sensor 11e of the end effector 11 and the feedback information from the operation device 400. That is, the control device 20 servo-controls the six motors 404. The control device 20 controls the output torque of each motor 404 so as to generate a reaction force corresponding to the above-described force data in response to a manipulation on the grip unit 401 by the user P.

Through the manipulation on the operation device 400 as described above, the robot 10 operates as described below. That is, the user P grasps the handle portions 401a and 401b of the grip unit 401 and moves the position and the posture of the grip unit 401 in a movement direction toward a target position for the grinding device 11a of the end effector 11 and a rotation direction toward a target posture for the grinding device 11a of the end effector 11. In addition, the user P activates the grinding device 11a by providing input to the input portion 401c of the grip unit 401.

The support 402 moves and changes the posture thereof together with the grip unit 401 to cause the six arms 403 to perform actions such as bending and posture change to rotate the rotation shafts of the motors 404 connected to the arms 403. The rotation sensors of the motors 404 output rotation signals to the control device 20, and the force sensor 405 outputs force signals to the control device 20.

The control device 20 generates a manual operation command or the like, based on the force signals, and operates the robot 10 according to the manual operation command or the like. The control device 20 operates the robot arm 12 such that the change in the position of the end effector 11, the change in the posture of the end effector 11, and the force of the end effector 11 acting to the object W via the grinding device 11a reflect the force signals. Accordingly, the user P is allowed to manipulate the grip unit 401 of the operation device 400 to cause the robot 10 to perform the intended operation.

Moreover, in order to provide a reaction force corresponding to the force data based on the detection signals of the force sensor 11e of the end effector 11 to the grip unit 401, the control device 20 generates a rotational load (also referred to as "load torque") corresponding to the reaction force, in each motor 404. Accordingly, for example, the user P is allowed to operate the position and the posture of the grip unit 401 while feeling a reaction force from the grip unit 401 as if receiving a reaction force from the object W.

The reaction force from the grip unit 401 reflects the magnitude and the direction of the force detected by the force sensor 11e. Such a reaction force from the grip unit 401 can make the user P feel the state, of the grinding device 11a during grinding, which differs depending on the surface state of the object, with user P's hands. For example, the reaction force from the grip unit 401 can make the user P's hands feel the feeling that is felt by the hands of the user P when the user P holds the grinding device 11a with user P's hands and performs grinding. Furthermore, the reaction force from the grip unit 401 can make the user P's hands feel the vibration of the grinding device 11a during grinding. In the present embodiment, the cushioning members 11d damp or reduce vibration transmitted from the grinding device 11a to the force sensor 11e, and suppress vibration felt by the user P's hands.

Moreover, commands of an amount of change in the position, an amount of change in the posture, and the magnitude of an action force of the end effector 11 are increased with respect to commands of an amount of change in position, an amount of change in posture, and the magnitude of a force which are indicated by the force signals of the force sensor 405. Accordingly, the robot arm 12 can change the position and the posture of the end effector 11 such that the range thereof greatly exceeds the moveable range of the grip unit 401. Furthermore, the robot arm 12 can generate an action force that greatly exceeds the force applied to the grip unit 401, in the end effector 11. For example, the user P in an upright state is allowed to move the grip unit 401 to cause the control device 20 to cause the robot arm 12 to change the posture of the grinding device 11a to a posture in which the grinding stone 11b faces downward, sideways, or upward. Therefore, it is possible to perform grinding work in various directions while maintaining the posture of the user P in an upright state, so that the burden on the user P is reduced. The above commands for the end effector 11 may be decreased with respect to or made the same as the above commands for the grip unit 401.

Moreover, the configuration of the operation device 400 is not limited to the configuration of FIG. 4, and may be any configuration that can change the position and the posture of a specific part, for example. For example, the operation device 400 may be composed of a master robot similar to the robot arm 12, and the robot 10 may be configured to be controlled as a slave robot. The operation device 400 may be a joystick.

The presentation device 50 presents an image, a sound, etc., which are for operating the robot system 1 and are received from the control device 20, to the user P of the robot system 1. Examples of the presentation device 50 include, but are not limited to, a liquid crystal display and an organic or inorganic electro-luminescence display (EL display). The presentation device 50 may include a speaker which emits sound.

In the present embodiment, the control device 20 can operate the robot system 1 in a manual operation mode, an autonomous operation mode, and a learning mode, but is not limited thereto. The manual operation mode, the autonomous operation mode, and the learning mode in the present embodiment do not include teaching operation that teaches the robot 10 the individual operations included in grinding work.

In the manual operation mode, the control device 20 causes the robot 10 to execute an operation according to a manipulation inputted to the operation device 400 by the operator who is the user P, that is, an operation that traces the manipulation. The robot 10 is manually operated by the operator. The control device 20 generates a manual operation command for causing the robot 10 to grind the grinding target region WA of the object W according to the manipulation information outputted from the operation device 400, and causes the robot 10 to execute a grinding operation according to the manual operation command. The manual operation command includes a command to operate the end effector 11, the robot arm 12, etc., but may further include a command to operate the transfer device 13.

The autonomous operation mode includes a first autonomous operation mode and a second autonomous operation mode. In the first autonomous operation mode, the control device 20 causes the robot 10 to autonomously execute grinding work according to data of a predetermined operation procedure. The data of the predetermined operation procedure is stored in the control device 20 in advance, and is stored as teaching data, which is data of a procedure taught to the robot 10, in the control device 20, for example. The control device 20 generates an autonomous operation command for causing the robot 10 to autonomously grind the grinding target region WA according to the teaching data, and causes the robot 10 to execute a grinding operation according to the autonomous operation command. The autonomous operation command includes a command to operate the end effector 11, the robot arm 12, etc., but may further include a command to operate the transfer device 13. The grinding work in the first autonomous operation mode is an example of first grinding work, and the autonomous operation command in the first autonomous operation mode is an example of a first autonomous operation command.

In the second autonomous operation mode, the control device 20 causes the robot 10 to autonomously execute grinding work according to an operation correspondence command outputted by a learning unit 20a described later. The learning unit 20a receives image data of the grinding target region WA of the object W taken by the imaging device 30, as input data, and outputs an operation correspondence command corresponding to operation data of the robot 10, as output data. The control device 20 generates an autonomous operation command, based on the operation correspondence command outputted by the learning unit 20a when the image data is inputted to the learning unit 20a, and causes the robot 10 to execute a grinding operation according to the autonomous operation command.

Moreover, in the present embodiment, during autonomous operation, the control device 20 can receive correction of the operation of the end effector 11 and the robot arm 12 using the operation device 400. The control device 20 corrects the operation of the end effector 11 and the robot arm 12 by adding a correction operation corresponding to a manipulation inputted to the operation device 400.

Here, grinding work in the second autonomous operation mode which is executed on the same grinding target region WA after the grinding work in the first autonomous operation mode is an example of second grinding work, and an autonomous operation command in such the second autonomous operation mode is an example of a second autonomous operation command. In addition, grinding work in the second autonomous operation mode which is executed on the grinding target region WA before grinding in the autonomous operation mode is an example of third grinding work, and an autonomous operation command in such the second autonomous operation mode is an example of a third autonomous operation command.

The learning mode is executed together with the manual operation mode or the autonomous operation mode. In the learning mode, the control device 20 stores and accumulates image data of the grinding target region WA and operation data of the robot 10 corresponding to a manual operation command and/or an autonomous operation command that are/is generated for the grinding target region WA in the state of the image data. Furthermore, the control device 20 causes the learning unit 20a to perform machine learning by using image data of the grinding target region WA and operation data for the grinding target region WA in the state of the image data. The learning mode includes a first learning mode and a second learning mode. In the first learning mode, the control device 20 causes the learning unit 20a to perform machine learning of operation data of the robot 10 in manual operation. In the second learning mode, the control device 20 causes the learning unit 20a to perform machine learning of operation data of the robot 10 obtained by adding correction by manual operation to operation during autonomous operation.

The operation data of the robot 10 in manual operation is operation data of the robot 10 in the manual operation mode for an unground grinding target region WA, in the manual operation mode executed after grinding work in the first autonomous operation mode is completed or interrupted, and in the manual operation mode executed after grinding work in the second autonomous operation mode is completed or interrupted. Such operation data includes operation data of the robot 10 corresponding to a manual operation command.

The operation data of the robot 10 obtained by adding correction by manual operation to operation during autonomous operation is operation data of the robot 10 obtained by adding correction by manual operation during grinding work in the first autonomous operation mode and during grinding work in the second autonomous operation mode. Such operation data can include operation data of the robot 10 corresponding to an autonomous operation command and a manual operation command.

The operation data of the robot 10 corresponding to the manual operation command may be manipulation information inputted to the operation device 400, may be a manual operation command that is a command for causing the robot 10 to operate so as to correspond to the manipulation information, may be a control command outputted from the control device 20 to the robot 10 according to the manual operation command, or may be information representing the operation result of the robot 10 that has operated according to the control command.

The operation data of the robot 10 corresponding to the autonomous operation command may be an autonomous operation command that is a command for causing the robot 10 to autonomously operate, may be a control command outputted from the control device 20 to the robot 10 according to the autonomous operation command, or may be information on the operation result of the robot 10 that has operated according to the control command.

[Hardware Configuration of Control Device]

Figure 5:
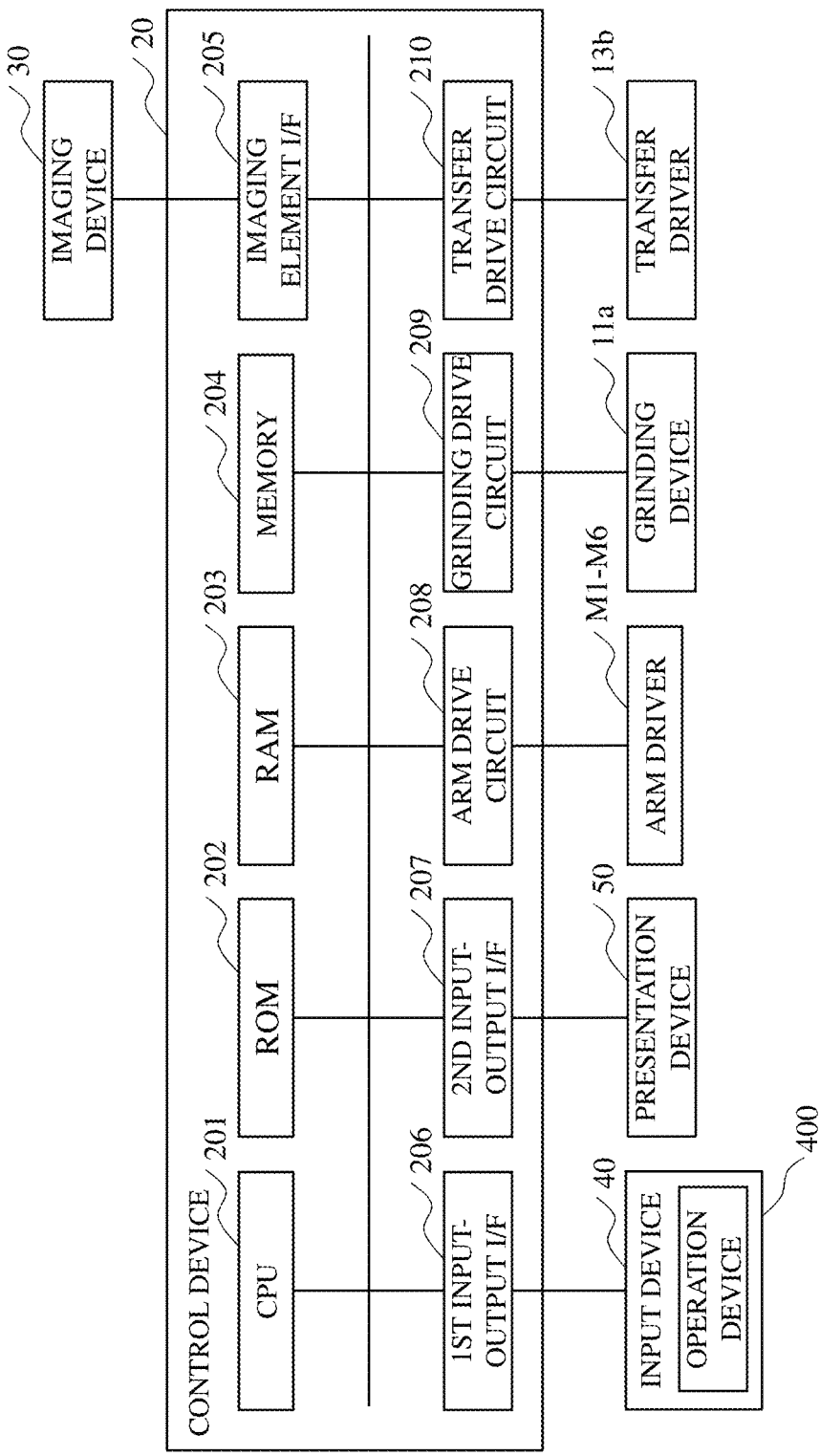
FIG. 5 is a block diagram showing an example of the hardware configuration of a control device according to the embodiment.

The hardware configuration of the control device 20 will be described. FIG. 5 is a block diagram showing an example of the hardware configuration of the control device 20 according to the embodiment. As shown in FIG. 5, the control device 20 includes a central processing unit (CPU) 201, a read only memory (ROM) 202, a random access memory (RAM) 203, a memory 204, an imaging element interface (I/F) 205, input-output I/Fs 206 and 207, an arm drive circuit 208, a grinding drive circuit 209, and a transfer drive circuit 210 as components. The above components are connected to each other via a bus, wired communication, or wireless communication. Not all of the above components are essential.

For example, the CPU 201 is a processor, and controls the overall operation of the control device 20. The ROM 202 includes anon-volatile semiconductor memory or the like, and stores a program, data, etc., for causing the CPU 201 to control the operation. The RAM 203 includes a volatile semiconductor memory or the like, and temporarily stores a program executed by the CPU 201, data in the middle of processing or processed data, etc. The memory 204 includes a storage device such as a semiconductor memory such as a volatile memory and a non-volatile memory, a hard disk (HDD: Hard Disc Drive) and a solid state drive (SSD), and stores various kinds of information.

For example, a program for operating the CPU 201 is stored in the ROM 202 or the memory 204 in advance. The CPU 201 reads and expands the program from the ROM 202 or the memory 204 to the RAM 203. The CPU 201 executes each coded instruction in the program expanded to the RAM 203.

Each function of the control device 20 may be realized by a computer system including the CPU 201, the ROM 202, the RAM 203, etc., may be realized by a dedicated hardware circuit such as an electronic circuit or an integrated circuit, or may be realized by a combination of the computer system and the hardware circuit.

Such a control device 20 may include, for example, a microcontroller, a micro processing unit (MPU), a large scale integration (LSI: large scale integrated circuit), a system LSI, a programmable logic controller (PLC), a logic circuit, etc. The functions of the control device 20 may be realized by being individually integrated into one chip, or may be realized by being integrated into one chip so as to include a part or all of the functions. In addition, each circuit may be a general-purpose circuit or may be a dedicated circuit. As the LSI, a field programmable gate array (FPGA) which can be programmed after the LSI is manufactured, a reconfigurable processor which can reconfigure the connection and/or setting of circuit cells inside the LSI, an application specific integrated circuit (ASIC) in which circuits having functions are integrated into one for a specific application, or the like may be used.

The imaging element I/F 205 controls the drive of an imaging element (not shown) of the camera 31 and the light source 32 of the imaging device 30 according to a command from the CPU 201. The imaging element I/F 205 captures the signal of an image taken by the camera 31 into the RAM 203 or the memory 204. The imaging element I/F 205 may include a circuit for driving the camera 31 and the light source 32, etc.

The first input-output I/F 206 is connected to the input device 40, and inputs and outputs information, data, commands, etc., with respect to the input device 40. The second input-output I/F 207 is connected to the presentation device 50, and inputs and outputs screen data, audio data, information, commands, etc., with respect to the presentation device 50. The input-output I/Fs 206 and 207 may each include a circuit that converts a signal, etc.

According to a command from the CPU 201, the arm drive circuit 208 supplies electric power to the servomotors of the arm drivers M1 to MA6 of the robot 10 and controls the drive of each servomotor. According to a command from the CPU 201, the grinding drive circuit 209 supplies electric power to the grinding device 11*a* and controls the drive of the grinding device 11*a*. According to a command from the CPU 201, the transfer drive circuit 210 supplies electric power to the transfer driver 13*b* of the transfer device 13 and controls the drive of the transfer driver 13*b*.

[Functional Configuration of Control Device]

The functional configuration of the control device 20 will be described. As shown in FIG. 2, the control device 20 includes the learning unit 20*a*, a mode determination unit 20*b*, an imaging control unit 20*c*, image processing units 20*d* to 20*e*, a manual command generation unit 20*f*, an autonomous command generation unit 20*g*, an operation control unit 20*h*, an operation information processing unit 20*i*, a data accumulation unit 20*j*, and storage units 20*p* to 20*s* as functional components. Furthermore, the operation control unit 20*h* includes a drive control unit 20*ha* and a transfer control unit 20*hb*. Not all of the above functional components are essential.

The functions of the functional components other than the storage units 20*p* to 20*s* are realized by the CPU 201 or the like, and the functions of the storage units 20*p* to 20*s* are realized by the memory 204, the ROM 202, and/or the RAM 203.

The storage units 20*p* to 20*s* store various kinds of information therein and allow the stored information to be read. The first storage unit 20*p* stores therein teaching data 20*pa* for causing the robot 10 to execute grinding work according to a predetermined operation procedure. The second storage unit 20*q* stores therein a learning model 20*qa* which is caused by the learning unit 20*a* to perform machine learning. The third storage unit 20*r* stores therein learning data 20*ra* to be used in machine learning of the learning model 20*qa*. The learning data 20*ra* is data including image data of a grinding target portion and operation data of the robot 10 corresponding to a manual operation command and/or an autonomous operation command that are generated for the grinding target portion in the state of the image data, in association with each other. The learning data 20ra is accumulated in the third storage unit 20r by the control device 20.

The fourth storage unit 20s stores various kinds of information therein. For example, the fourth storage unit 20s stores a camera parameter of the camera 31 therein. The fourth storage unit 20s stores therein an object to be ground by the robot 10 and the position, the shape, the dimensions, etc., of a grinding target region of the object in association with each other. The fourth storage unit 20s may store therein an image taken by the camera 31, a processed image of the image and/or a program, etc. The camera parameter includes an external parameter and an internal parameter. Examples of the external parameter include parameters indicating the position (three-dimensional position), the orientation (orientation of the optical axis center), etc., of the camera 31. Examples of the internal parameter include parameters indicating the distortion and the focal length of a lens, the size of one pixel of the imaging element, pixel coordinates of the optical axis center, etc., of the camera 31. The pixel coordinates are two-dimensional coordinates with a pixel on an image as a unit.

The mode determination unit 20b determines a mode to be executed by the robot system 1, from the manual operation mode, the first and second autonomous operation modes, and the first and second learning modes according to a command to designate a mode via the input device 40, and causes the other functional components to operate according to the determined mode.

During execution of each mode, the imaging control unit 20c controls the operation of the camera 31 and the light source 32 and acquires an image taken by the camera 31. Taking an image by the camera 31 and acquiring the image taken by the camera 31 include acquiring one still image taken by the camera 31 and acquiring a still image of one frame from a moving image taken by the camera 31. The imaging control unit 20c outputs two images taken at the same time by the camera 31, which is a stereo camera, in association with each other to the first image processing unit 20d, etc. The imaging control unit 20c operates the camera 31 and the light source 32 in synchronization, and, for example, causes the camera 31 to take an image during illumination of the light source 32. For example, during execution of each mode, the imaging control unit 20c causes the imaging device 30 to take an image of the grinding target region WA of the object W at a predetermined timing. For example, the predetermined timing may be continuous timing, or may be intermittent or single timing. The imaging device 30 taking an image is that the camera 31 takes an image in synchronization with the light source 32.

In the present embodiment, in each of the autonomous operation mode and the manual operation mode, the imaging control unit 20c causes the imaging device 30 to take an image of the grinding target region WA at timings before, during, and after grinding work in the operation mode, but is not limited thereto. For example, the imaging control unit 20c causes the imaging device 30 to intermittently take an image at predetermined time intervals during the grinding work.

The first image processing unit 20d detects the three-dimensional position of each position of the grinding target region WA by processing an image taken by the imaging device 30, and generates three-dimensional image data that is image data representing the three-dimensional position of each position.

Specifically, the first image processing unit 20d specifies the grinding target region WA shown in each of two images taken at the same time by the imaging device 30. For example, the first image processing unit 20d may extract the edge of the grinding target region WA by performing comparison with the shape of the grinding target region WA stored in the fourth storage unit 20s by a pattern matching method or the like. Moreover, the first image processing unit 20d detects the distance between the camera 31 and a subject shown at each pixel of at least one of the two images, by performing image processing by a stereo matching method or the like using the camera parameter stored in the fourth storage unit 20s. Furthermore, for the subject shown at each pixel, the first image processing unit 20d detects a three-dimensional position in the three-dimensional space in which the robot system 1 exists.

In each mode, the first image processing unit 20d generates three-dimensional image data and outputs the three-dimensional image data to the learning unit 20a, the data accumulation unit 20j, and/or the second image processing unit 20e. The three-dimensional image data is image data including, as information of each pixel, information that includes the three-dimensional position of a subject shown at each pixel and region-corresponding information of whether or not the subject is the grinding target region WA, in association with each other.

The first image processing unit 20d may generate three-dimensional image data without using image processing by a stereo matching method or the like. The imaging device 30 can take an image in which shading, reflection, halation, metallic luster, etc. are suppressed, and shades represented in such an image can represent the surface state such as unevenness of the grinding target region WA. The first image processing unit 20d can detect the relative position relationship in the line-of-sight direction of the camera 31 between the subjects shown at the respective pixels, based on the difference between the luminance values of the pixels. The first image processing unit 20d can detect the distance between the subject at each pixel in the grinding target region WA and the camera 31, based on the above relative position relationship, and generate three-dimensional image data.

The second image processing unit 20e generates image data representing the three-dimensional shape of the grinding target region WA, by using the three-dimensional image data generated by the first image processing unit 20d. For example, the second image processing unit 20e generates a distance image of the grinding target region WA. A luminance value that is a pixel value of each pixel of the distance image is a distance value between the camera 31 and the subject shown at the pixel. The distance image is represented as a grayscale image in which the shades of the pixels change according to the distance. However, the second image processing unit 20e may generate a color distance image by performing image processing on the distance image. The color distance image is an image in which the colors represented by the pixels change according to the distance value which is a pixel value. The second image processing unit 20e outputs the generated distance image to the presentation device 50 and displays the distance image thereon. Accordingly, the user P of the robot system 1 is allowed to visually recognize the three-dimensional shape of the grinding target region WA. Moreover, in addition to the distance image or instead of the distance image, the second image processing unit 20e may output a taken image of the grinding target region WA to the presentation device 50 and may display the taken image thereon. Accordingly, the user P is also allowed to visually recognize the actual state of the grinding target region WA. The user P is allowed to manually operate the robot 10 while viewing these images.

The manual command generation unit 20f generates a manual operation command for causing the robot 10 to grind the grinding target region WA, according to the manipulation information outputted from the operation device 400, and outputs the manual operation command to the operation control unit 20h. The manual command generation unit 20f generates an operation command for causing the robot 10 to perform an operation corresponding to the manipulation information, as the manual operation command.

The operation command includes at least either one of a force command representing a force to be applied to an object by the end effector 11 of the robot 10 or a position command representing a position of the end effector 11, and includes both commands in the present embodiment. The force command may include a command of the magnitude of the force and the direction of the force. Furthermore, the force command may include an execution time of the command of the magnitude and the direction of the force. The position command may include a command of a three-dimensional position and a three-dimensional posture of the end effector 11. Furthermore, the position command may include an execution time of the command of the three-dimensional position and the three-dimensional posture. The three-dimensional posture is a posture in the three-dimensional space.

In the present description and the claims, the "force" means to be able to include at least the magnitude of the force out of the magnitude and the direction of the force, and the "position" means to be able to include at least a three-dimensional position out of a three-dimensional position and a three-dimensional posture. In addition, the operation command may include commands of drive and drive stop of the grinding device 11a and a position command for the transfer device 13. The position command for the transfer device 13 includes at least a three-dimensional position out of a three-dimensional position and a three-dimensional posture of the transfer device 13.

The autonomous command generation unit 20g generates an autonomous operation command for causing the robot 10 to autonomously grind the grinding target region WA, and outputs the autonomous operation command to the operation control unit 20h. The autonomous operation command includes a position command, a force command, etc. In the first autonomous operation mode, the autonomous command generation unit 20g reads the teaching data 20pa in the first storage unit 20p, and generates an autonomous operation command for causing the robot 10 to operate according to the teaching data 20pa. In the second autonomous operation mode, the autonomous command generation unit 20g generates an autonomous operation command for causing the robot 10 to operate according to the operation correspondence command outputted by the learning unit 20a with the three-dimensional image data of the grinding target region WA as input data.

The operation control unit 20h controls the operation of grinding work of the robot 10 according to the autonomous operation command and the manual operation command. The operation control unit 20h generates a control command for causing each component of the robot 10 to operate according to the autonomous operation command and the manual operation command, and outputs the control command to the robot 10. The operation control unit 20h acquires information of the operating state of each component of the robot 10 from the operation information processing unit 20i, and generates a control command by using this information as feedback information.

The drive control unit 20ha of the operation control unit 20h generates a control command for operating the servomotors of the arm drivers M1 to M6 of the robot arm 12 and the motor of the grinding device 11a of the end effector 11. The transfer control unit 20hb of the operation control unit 20h generates a control command for operating the servomotors of the transfer driver 13b of the transfer device 13.

The operation information processing unit 20i detects and processes operation information of the robot 10. The operation information processing unit 20i detects an ON state and an OFF state of the grinding device 11a as operation information, based on the energization state of the grinding device 11a or the like. In the present embodiment, the operation information processing unit 20i acquires detection values of rotation sensors (not shown) of the respective servomotors of the arm drivers M1 to M6, detection values of current sensors (not shown) of the respective servomotors, and detection values of the force sensor 11e of the end effector 11 as operation information, but is not limited thereto. Furthermore, the operation information processing unit 20i acquires detection values of rotation sensors (not shown) of the servomotors of the transfer driver 13b of the transfer device 13 and detection values of current sensors (not shown) of the servomotors as operation information. The operation information processing unit 20i may acquire command values of currents supplied to the servomotors of the arm drivers M1 to M6 and the servomotors of the transfer driver 13b by the arm drive circuit 208 and the transfer drive circuit 210, respectively, as operation information. The operation information processing unit 20i outputs the above operation information as feedback information to the operation control unit 20h.

The transfer device 13 may include a position measuring device such as a global positioning system (GPS) receiver and an inertial measurement unit (IMU), and may include a detector for detecting a weak induced current from an electric wire embedded in a floor surface. The operation information processing unit 20i may acquire detection values of the position measuring device and the detector as operation information.

Furthermore, the operation information processing unit 20i outputs the operation information of the robot 10 to the data accumulation unit 20j and the input device 40 in addition to the operation control unit 20h. The operation information processing unit 20i may convert the operation information into information suitable for input to each of the operation control unit 20h, the data accumulation unit 20j, and the input device 40. For example, for the operation control unit 20h, the operation information processing unit 20i may convert the operation information into information corresponding to the control command for the robot 10; for the data accumulation unit 20j, the operation information processing unit 20i may convert the operation information into information corresponding to the operation data of the robot 10; and for the input device 40, the operation information processing unit 20i may convert the operation information into information corresponding to the control command for each motor 404 of the operation device 400. The operation information processing unit 20i may receive the operation data of the robot 10 from the operation control unit 20h, the autonomous command generation unit 20g, the manual command generation unit 20f, etc., and may output the operation data to the data accumulation unit 20j, etc.

The data accumulation unit 20j accumulates the learning data 20ra for use in machine learning of the learning model 20qa, in the third storage unit 20r. The data accumulation unit 20j acquires the three-dimensional image data of the grinding target region WA from the first image processing unit 20d. Furthermore, the data accumulation unit 20j acquires operation data of the robot 10 corresponding to a manual operation command and an autonomous operation command which are generated for the grinding target region WA in the state of the three-dimensional image data, via the operation information processing unit 20i. Examples of the operation data include the manipulation information of the operation device 400, the autonomous operation command of the autonomous command generation unit 20g, the manual operation command of the manual command generation unit 20f, the control command of the drive control unit 20ha, the operation information of the robot 10, etc.

The operation data is operation data corresponding to a manual operation command and an autonomous operation command that are generated between the time at which an original image of the three-dimensional image data is taken and the time at which the next image is taken. The data accumulation unit 20j stores the three-dimensional image data and the operation data in association with each other in the third storage unit 20r. Accordingly, for example, when grinding work is performed on the grinding target region WA from time $T_0$ to time $T_0$ (n: an integer of 1 or more), three-dimensional image data of the grinding target region WA at time $T_k$ (k: 0, 1, . . . , n−1) and operation data for the grinding target region WA between time $T_k$ and time $T_{k+1}$ are stored in association with each other in the third storage unit 20r. For example, time $T_k$ may be a time to take an image.

The learning unit 20a uses the learning model 20qa of the second storage unit 20q, with the three-dimensional image data of the grinding target region WA as input data, to output an operation correspondence command corresponding to the operation data of the robot 10 for the grinding target region WA in the state of the three-dimensional image data, as output data, and transmits the operation correspondence command to the autonomous command generation unit 20g. The operation correspondence command is data obtained by converting the operation data of the robot 10 so as to be suitable for input to the autonomous command generation unit 20g. For example, the learning unit 20a inputs information of each pixel of the three-dimensional image data to the learning model 20qa, and causes the learning model 20qa to output the operation data of the robot 10 for the grinding target region WA in the state of the three-dimensional image data. The learning unit 20a converts the operation data into an operation correspondence command.

Moreover, the learning unit 20a causes the learning model 20qa to perform machine learning by using the learning data 20ra stored in the third storage unit 20r. The timing at which machine learning of the learning model 20qa is executed may be any timing. For example, the learning unit 20a may execute machine learning each time grinding work for one grinding target region is completed, or may execute machine learning each time grinding work for a region group consisting of grinding target regions is completed. In addition, the learning unit 20a may execute machine learning according to a predetermined temporal timing such as a predetermined time, a predetermined number of days, a predetermined number of weeks, and a predetermined number of months.

The learning model 20qa is a model that performs machine learning, and improves the accuracy of output data with respect to input data by performing learning using the learning data 20ra. The learning model 20qa includes a learning model such as a neural network, Random Forest, Genetic Programming, a regression model, a tree model, a Bayesian model, a time series model, a clustering model, and an ensemble learning model. In the present embodiment, the learning model 20qa includes a neural network.

The learning model 20qa performs machine learning by using three-dimensional image data of a grinding target region and operation data of the robot 10 corresponding to an autonomous operation command and a manual operation command that are generated for the grinding target region in the state of the three-dimensional image data. For example, in machine learning, the three-dimensional image data is used as input data, and the operation data is used as teacher data. Furthermore, weighting of connections between nodes in a neural network described later is adjusted such that, for example, the teacher data and the operation data (output data) of the robot 10 outputted by the learning model 20qa when input data is inputted are caused to match each other or a difference therebetween is minimized. After such weighting adjustment, when three-dimensional image data of the grinding target region is inputted, the learning model 20qa can output operation data of the robot 10 that allows appropriate grinding work to be achieved for the grinding target region in the state of the three-dimensional image data.

Figure 6:
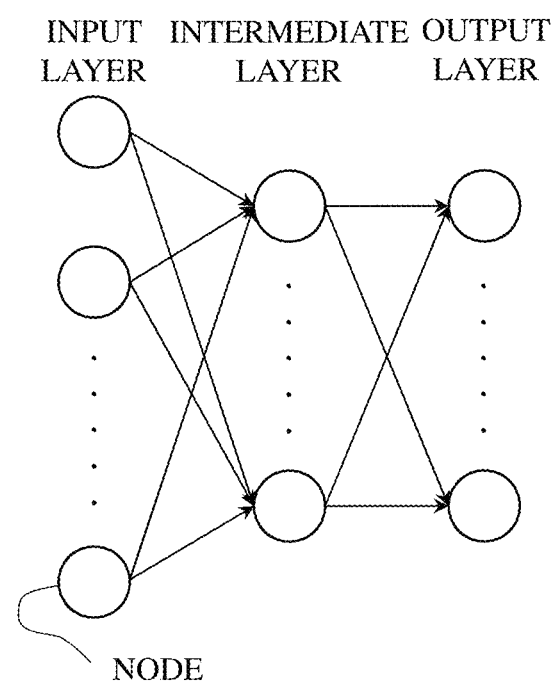
FIG. 6 is a diagram showing an example of a model of a neural network.

The neural network includes node layers including an input layer and an output layer. Each node layer includes one or more nodes. For example, the learning model 20qa may include a neural network shown in FIG. 6. FIG. 6 is a diagram showing an example of a model of a neural network. In case that the neural network includes an input layer, an intermediate layer, and an output layer, the neural network sequentially performs an output process from the input layer to the intermediate layer and an output process from the intermediate layer to the output layer on information inputted to a node of the input layer, and outputs an output result that fits the input information. Each node of one layer is connected to each node of the next layer, and connections between the nodes are weighted. Information of each node of one layer is provided with weighting of a connection between nodes, and outputted to each node of the next layer.

Figure 7:
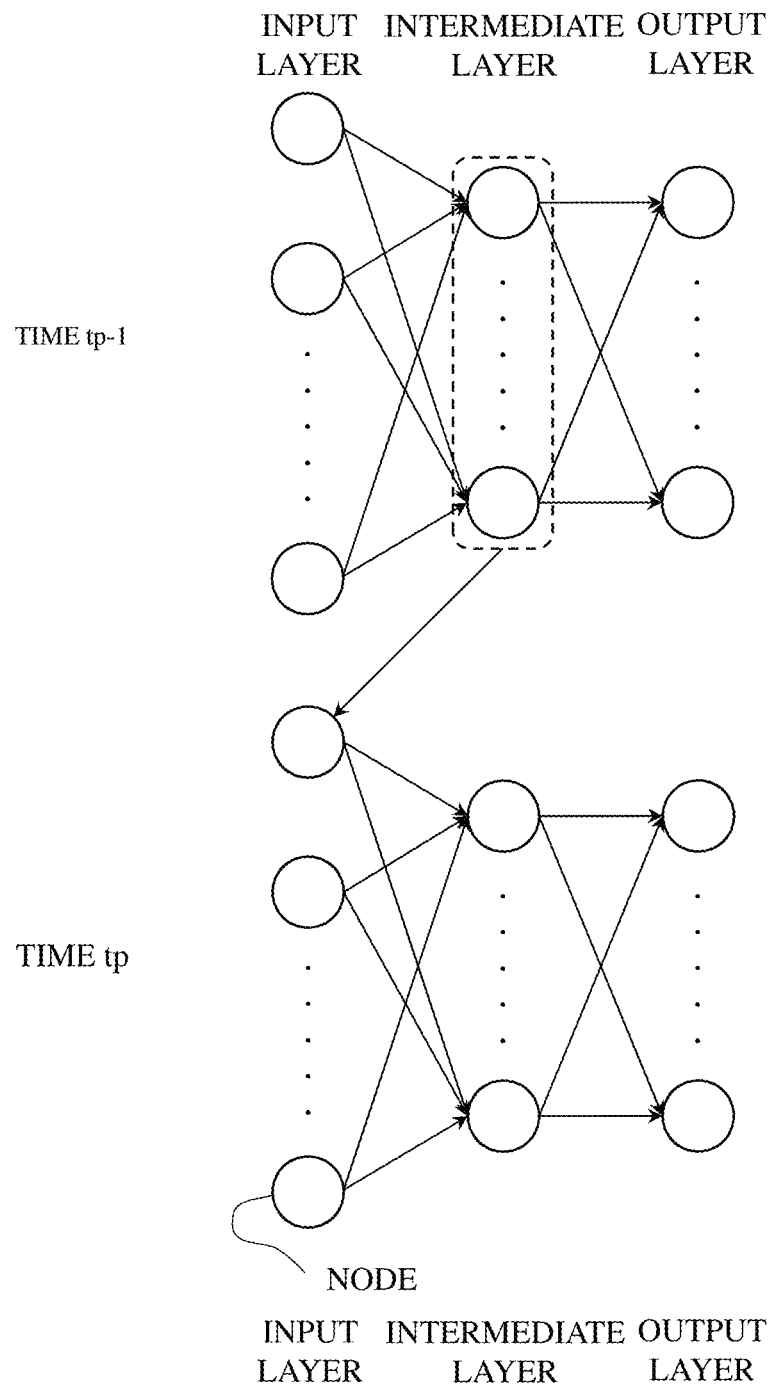
FIG. 7 is a diagram showing another example of a model of a neural network.

The learning model 20qa may include a recurrent neural network shown in FIG. 7. FIG. 7 is a diagram showing another example of a model of a neural network. The recurrent neural network handles time series information. Input data of the recurrent neural network includes data at the present time $t_p$ and output data of an intermediate layer in the recurrent neural network at time $t_{p-1}$ previous to time $t_p$. As described above, the recurrent neural network has a network structure that takes time series information into consideration. Such a recurrent neural network performs output that takes the behavior of input data over time into consideration, and thus can improve the accuracy of output data. The neural network of the learning model 20qa is preferably a recurrent neural network since time series data is handled as described below.

Figure 8:
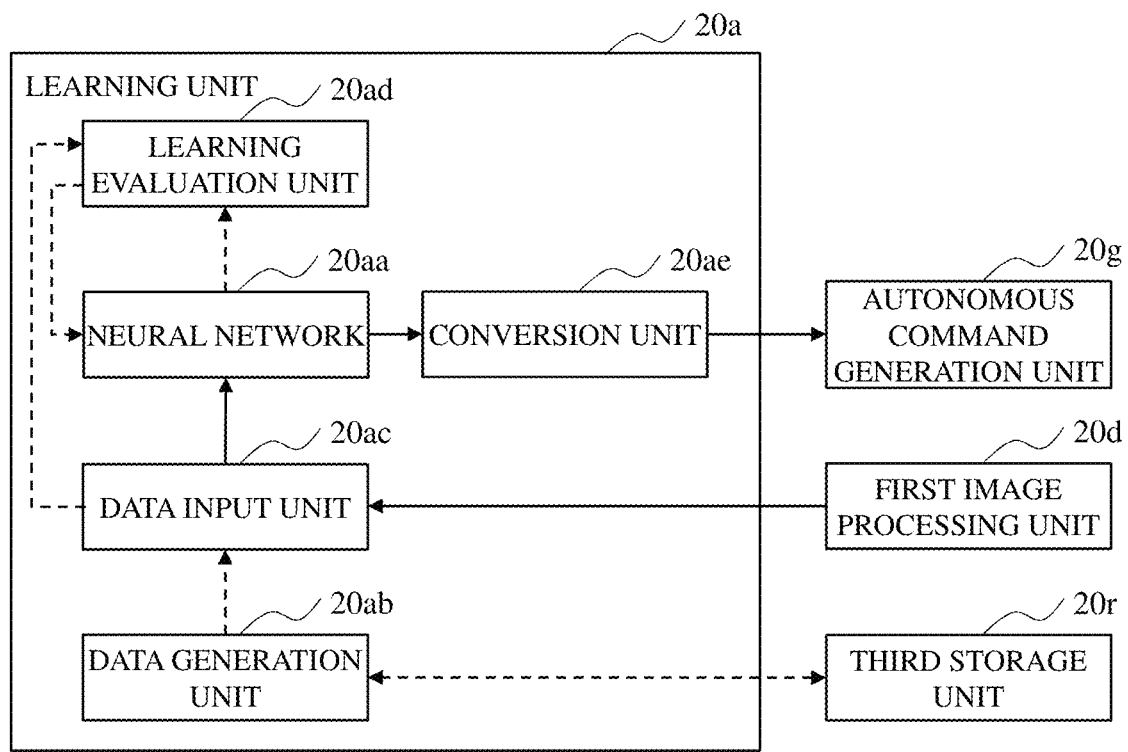
FIG. 8 is a block diagram showing an example of the functional configuration of a learning unit according to the embodiment.

An example of the configuration of the learning unit 20a will be described. FIG. 8 is a block diagram showing an example of the functional configuration of the learning unit 20a according to the embodiment. As shown in FIG. 8, the learning unit 20a includes a neural network 20aa of the learning model 20qa which is read from the second storage unit 20q, a data generation unit 20ab, a data input unit 20ac, a learning evaluation unit 20ad, and a conversion unit 20ae.

At the time of input/output of data and at the time of machine learning, the data input unit 20ac sequentially inputs information of each pixel of three-dimensional image data of a grinding target region to each node of an input layer of the neural network 20aa.

The data generation unit 20ab generates input learning data and teacher data to be used in machine learning, by using the learning data 20ra stored in the third storage unit 20r, in the first and second learning modes. The data generation unit 20ab generates input learning data from the three-dimensional image data of the grinding target region, and generates teacher data from operation data of the robot 10 generated for the grinding target region in the state of the three-dimensional image data. For example, the input learning data is information of each pixel of the three-dimensional image data. In the first learning mode, the operation data is operation data corresponding to a manual operation command for the grinding target region. In the second learning mode, the operation data is operation data corresponding to a manual operation command and an autonomous operation command for the grinding target region.

The learning evaluation unit 20ad optimizes the neural network 20aa by using the learning data 20ra. When the information of each pixel of the three-dimensional image data which is input learning data is inputted, the neural network 20aa outputs operation data for the grinding target region in the state of the three-dimensional image data, as output data. The learning evaluation unit 20ad adjusts the weights between the nodes of the neural network 20aa through backward calculation such that, for example, the teacher data and the output data of the learning data 20ra are caused to match each other or a difference therebetween is minimized.

The conversion unit 20ae converts the output data of the neural network 20aa and outputs the resulting data to the autonomous command generation unit 20g. The conversion unit 20ae converts the output data of the neural network 20aa into an operation correspondence command that is data suitable for input to the autonomous command generation unit 20g.

Next, processing of each component of the learning unit 20a at the time of machine learning in the learning mode will be described. In this example, during grinding work of the robot 10 in the learning mode, a taken image of the grinding target region is acquired at a predetermined sampling period Ts, and each command and each data are acquired at a predetermined sampling interval within the sampling period Ts. For example, the imaging control unit 20c acquires a taken image of the grinding target region at times $T_0, T_1, \ldots, T_O$ (n: an integer of 1 or more) in each sampling period Ts, and the first image processing unit 20d generates three-dimensional image data $Id_0, Id_1, \ldots, Id_n$ of each taken image.

The data accumulation unit 20j acquires operation data $Pd_{k0}, Pd_{k1}, \ldots, Pd_{ku}$ at sampling times that are times $T_k+t_0, T_k+t_1, \ldots, T_k+t_u$ (u: an integer of 1 or more), respectively, within one sampling period Ts between times $T_k$ and $T_{k+1}$ (k: 0, 1, ..., n−1). The operation data $Pd_{k0}$ to $Pd_{ku}$ are time series data. The numerical subscript in each time series data indicates the order of the sampling period or sampling time. The data accumulation unit 20j stores the three-dimensional image data $Id_k$ at each time $T_k$ and the operation data $Pd_{k0}$ to $Pd_{ku}$ between time $T_k$ and time $T_{k+1}$ in association with each other, as the learning data 20ra, in the third storage unit 20r.

The data generation unit 20ab generates input learning data $Ipd_k$, which is information of each pixel, from the three-dimensional image data $Id_k$ at each time $T_k$, and generates teacher data $Pm_{k0}$ to $Pm_{ku}$ from the operation data $Pd_{k0}$ to $Pd_{ku}$.

The data input unit 20ac sequentially inputs the information of each pixel of the input learning data $Ipd_k$ to each node of the input layer of the neural network 20aa. The neural network 20aa outputs predicted operation data $PPd_{k0}$ to $PPd_{ku}$ at a sampling period between times $T_k$ and $T_{k+1}$ through forward calculation.

The learning evaluation unit 20ad adjusts the weights between the nodes of the neural network 20aa through backward calculation such that, for example, the teacher data $Pm_{k0}$ to $Pm_{ku}$ and the predicted operation data $PPd_{k0}$ to $PPd_{ku}$ at time $T_k$ are caused to match each other or a difference therebetween is minimized. For example, the learning evaluation unit 20ad may optimize the weights between the nodes by performing the above process on a combination of the teacher data $Pm_{k1}$ and the predicted operation data $PPd_{k1}$ corresponding to the sampling time $T_{ki}$ (i: an integer of 0 to u), and further performing the above process on combinations at all the sampling times.

Next, processing of each component of the learning unit 20a at the time of input/output of data in the second autonomous operation mode will be described. During grinding work of the robot 10, the imaging control unit 20c takes an image of the grinding target region at times $T_0$ to $T_m$ (m: an integer of 1 or more) in each predetermined sampling period Ts. The first image processing unit 20d generates three-dimensional image data $Id_0$ to $Id_m$ of each image.

For example, the first image processing unit 20d processes an image taken at time $T_j$ (j: an integer of 0 to m) to generate three-dimensional image data $Id_j$, and outputs the three-dimensional image data $Id_j$ to the learning unit 20a. The data input unit 20ac inputs the information of each pixel of the three-dimensional image data $Id_j$ to the neural network 20aa. When the above information is used as input data, the neural network 20aa outputs operation data $PPd_{j0}$ to $PPd_{ju}$ of the robot 10 at sampling times $T_j+t_0$ to $T_j+t_u$ between times $T_j$ and $T_{j+1}$ as output data. When grinding on the grinding target region is unnecessary, the neural network 20aa outputs operation data that does not cause the robot 10 to operate, or does not output operation data.

The conversion unit 20ae converts the output data of the neural network 20aa into an operation correspondence command, and outputs the operation correspondence command to the autonomous command generation unit 20g. The autonomous command generation unit 20g generates an autonomous operation command in which the operation data $PPd_{j0}$ to $PPd_{ju}$ at sampling times $T_j+t_0$ to $T_j+t_u$ are reflected. As described above, when the neural network 20aa outputs the operation data $PPd_{j0}$ to $PPd_{ju}$ with the three-dimensional image data $Id_1$ at each imaging time $T_j$ as input data, an autonomous operation command in which the operation data are reflected is generated.

The neural network 20aa may be configured such that the three-dimensional image data $Id_k$ at imaging time $T_k$ and three-dimensional image data $Id_{k-1}$ to $Id_{k-s}$ at times $T_{k-1}$ to $T_{k-s}$ (s: a predetermined natural number) previous to imaging time $T_k$ are inputted as input data thereto.

In this case, at the time of machine learning, the data input unit 20ac inputs the three-dimensional image data $Id_k$ and $Id_{k-1}$ to $Id_{k-s}$ as the learning data 20ra at imaging time $T_k$ to the neural network 20aa, and the neural network 20aa outputs operation data at times $T_k$ to $T_{k+1}$. The learning evaluation unit 20ad adjusts the weights between the nodes of the neural network 20aa with respect to the outputted operation data and the teacher data $Pm_{k0}$ to $Pm_{ku}$. In addition, at the time of input/output of data, the neural network 20aa inputs the three-dimensional image data $Id_j$ and $Id_{j-1}$ to Id$_{j-s}$ at times T$_j$ and T$_{j-1}$ to T$_{j-s}$ as input data at time T$_j$, and outputs operation data at times T$_j$ to T$_{j+1}$.

Such a neural network 20*aa* can improve the learning efficiency and the learning accuracy thereof. The neural network 20*aa* predicts an operation of the robot 10, based on not only instantaneous three-dimensional image data at the present time but also a series of three-dimensional image data at times previous to the present time, and thus enables accurate prediction.

[Operation of Robot System]

The operation of the robot system 1 according to the embodiment will be described. Specifically, operations in the second autonomous operation mode, the first learning mode, and the second learning mode will be described.

[Second Autonomous Operation Mode]

Figure 9:
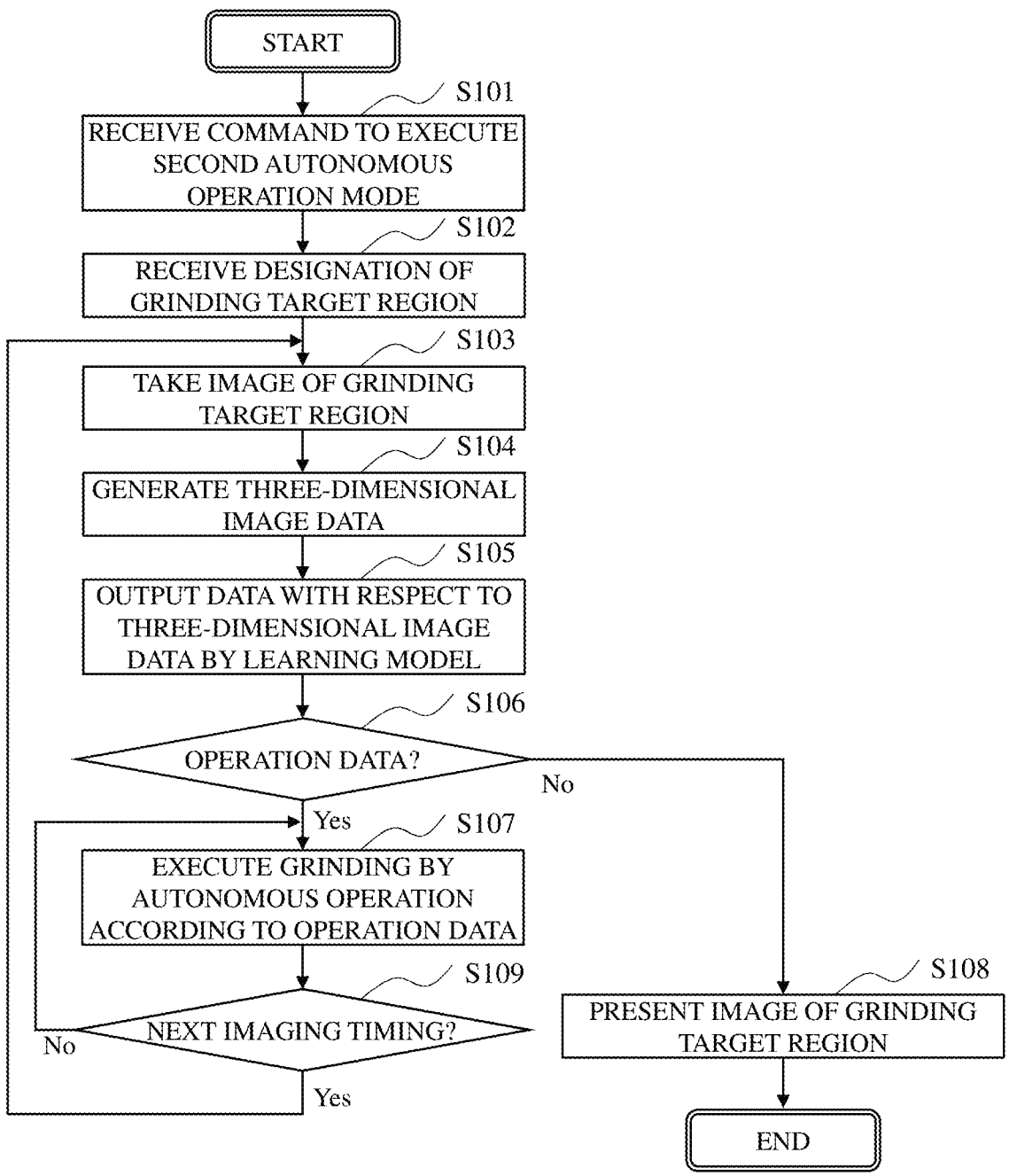
FIG. 9 is a flowchart showing an example of the operation in a second autonomous operation mode of the robot system according to the embodiment.

FIG. 9 is a flowchart showing an example of the operation in the second autonomous operation mode of the robot system 1 according to the embodiment. As shown in FIG. 9, first, in step S101, the user P who is an operator or the like inputs a command to execute the second autonomous operation mode, to the input device 40. The control device 20 receives the command and starts control in the second autonomous operation mode.

Next, in step S102, the control device 20 receives a command to designate the grinding target region WA of the object W which is inputted to the input device 40 by the user P. The command may include, for example, information indicating the position of the grinding target region WA, etc.

Next, in step S103, the control device 20 controls the robot 10 to move the imaging device 30, and causes the imaging device 30 to take an image of the grinding target region WA. The control device 20 may present the taken image to the user P via the presentation device 50.

Next, in step S104, the control device 20 processes the image of the grinding target region WA, thereby generating three-dimensional image data of the image. Next, in step S105, the control device 20 inputs the three-dimensional image data to the learning model 20*aa* and causes the learning model 20*qa* to output data with respect to the three-dimensional image data.

Next, in step S106, the control device 20 determines whether or not the outputted data is operation data of the robot 10. When the outputted data is operation data of the robot 10 (Yes in step S106), the control device 20 proceeds to step S107. When the outputted data is not operation data of the robot 10 (No in step S106), the control device 20 proceeds to step S108. When grinding on the grinding target region WA is unnecessary, the learning model 20*qa* outputs data other than operation data of the robot 10, or does not output data.

Next, in step S107, the control device 20 causes the robot 10 to execute grinding on the grinding target region WA by autonomous operation according to the above operation data. Specifically, the control device 20 generates an autonomous operation command in which an operation correspondence command corresponding to the operation data is reflected, outputs a control command based on the autonomous operation command to the robot 10, and causes the arm drivers M1 to M6 and the grinding device 11*a* to perform the desired operation.

Next, in step S109, the control device 20 determines whether or not the next imaging timing has been reached. This imaging timing is the timing at which one sampling period elapses after the image of the grinding target region WA is taken. When the next imaging timing has been reached (Yes in step S109), the control device 20 proceeds to step S103 and repeats the processes in step S103 and the subsequent steps. When the next imaging timing has not been reached (No in step S109), the control device 20 returns to step S107. The control device 20 may include a timer, a clock, or the like for measuring time, and may perform counting for the imaging timing at each predetermined time period.

In step S108, the control device 20 presents the image taken in the immediately previous step S103, to the user P via the presentation device 50, and ends the grinding work in the second autonomous operation mode.

Through the processes in steps S101 to S109 described above, the control device 20 can control the robot 10 so as to correspond to the state of the grinding work region represented by the three-dimensional image data, and can autonomously perform grinding work suitable for the state. Furthermore, the control device 20 can control the robot 10 so as to correspond to the progress state of grinding, and can autonomously perform grinding work.

The grinding work in the second autonomous operation mode can be applied to grinding work (for example, finish grinding) on a grinding work region after the end of grinding work (for example, rough cutting work) according to teaching data in the first autonomous operation mode. Alternatively, the grinding work in the second autonomous operation mode can be applied to grinding work (for example, finish or repair grinding) on a grinding work region after the end of grinding work in the second autonomous operation mode. Still alternatively, the grinding work in the second autonomous operation mode can be applied to grinding work (for example, finish or repair grinding) on a grinding work region after the end of grinding work in the manual operation mode. Still alternatively, the grinding work in the second autonomous operation mode can be applied to grinding work on an unground grinding work region.

[First Learning Mode]

Figure 10:
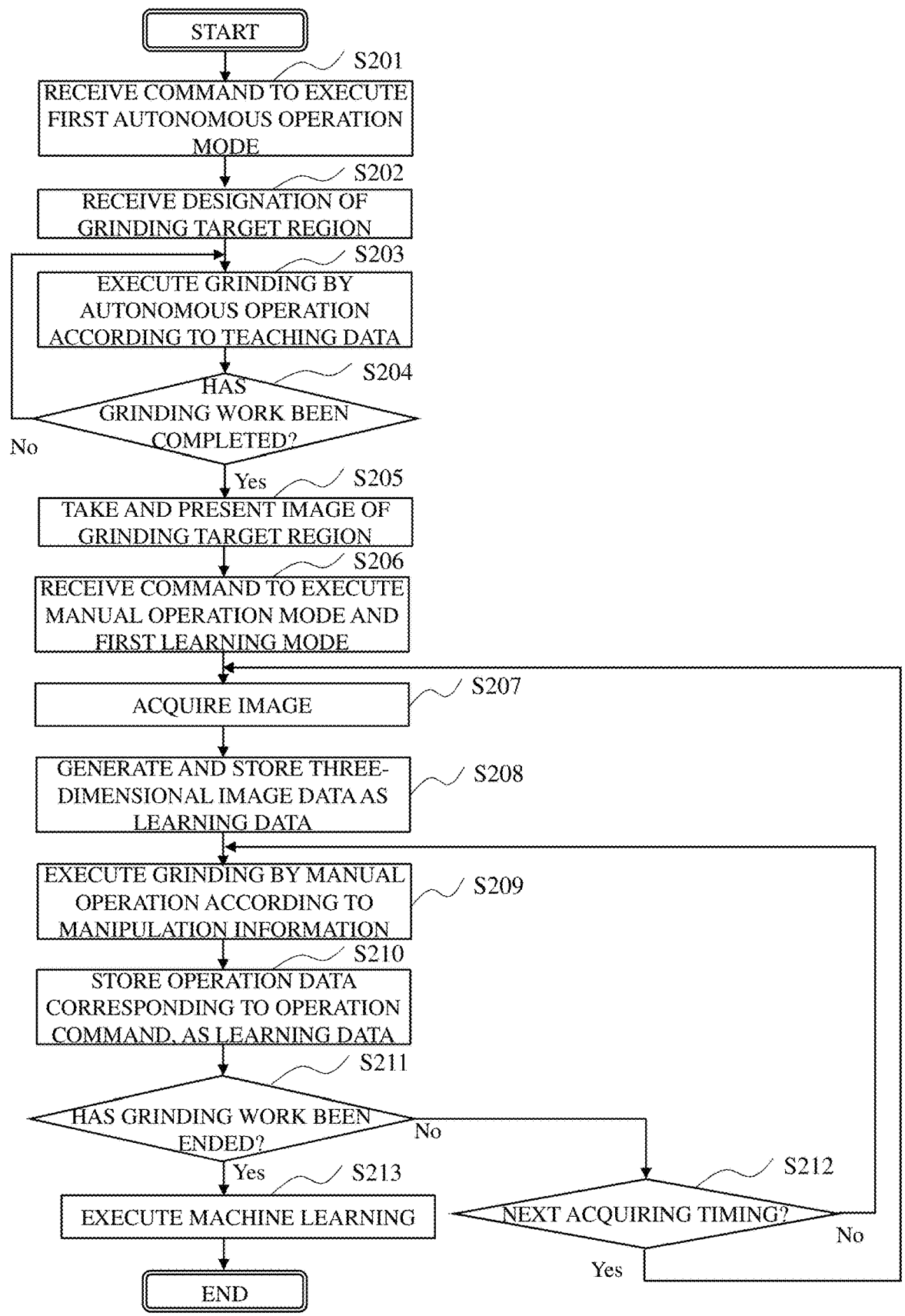
FIG. 10 is a flowchart showing an example of the operation in a first learning mode of the robot system according to the embodiment.

FIG. 10 is a flowchart showing an example of the operation in the first learning mode of the robot system 1 according to the embodiment. FIG. 10 shows an example in which the first learning mode is executed together with the manual operation mode on the grinding target region WA after the end of grinding in the first operation mode.

As shown in FIG. 10, first, in step S201, the control device 20 receives a command to execute the first autonomous operation mode which is inputted to the input device 40 by the user P, and starts control in the first autonomous operation mode.

Next, in step S202, the control device 20 receives designation of the grinding target region WA which is inputted to the input device 40.

Figure 11:
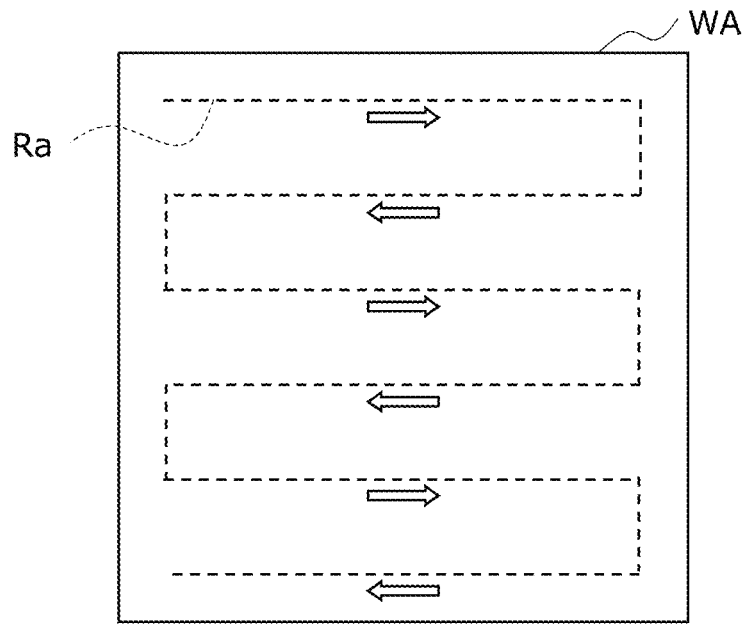
FIG. 11 is a diagram showing an example of grinding operation on a grinding target region by a robot according to teaching data.

Next, in step S203, the control device 20 reads the teaching data 20*pa* in the first storage unit 20*p*, and causes the robot 10 to execute grinding on the grinding target region WA by autonomous operation according to the teaching data 20*pa*. Specifically, the control device 20 generates an autonomous operation command according to the teaching data 20*pa*, transmits a control command based on the autonomous operation command to the robot 10, and causes the robot 10 to perform an operation according to the teaching data 20*pa*. For example, as shown in FIG. 11, the control device 20 controls the robot 10 so as to move the grinding device 11*a* along a predetermined path Ra (shown by a broken line) in the directions of hollow arrows on the grinding target region WA while pressing the grinding stone 11*b* against the surface of the grinding target region WA. FIG. 11 is a diagram showing an example of grinding operation on the grinding target region WA by the robot 10 according to the teaching data 20*pa*.

Next, in step S204, the control device 20 determines whether or not the grinding work on the grinding target region WA has been completed. When all the operations included in the teaching data 20*pa* have already been executed by the robot 10, the grinding work is completed. When the grinding work has been completed (Yes in step S204), the control device 20 proceeds to step S205. When the grinding work has not been completed (No in step S204), the control device 20 returns to step S203.

In step S205, the control device 20 causes the imaging device 30 to take an image of the grinding target region WA, presents the taken image to the user P via the presentation device 50, and ends the grinding work in the first autonomous operation mode.

In step S206, the user P inputs a command to execute the manual operation mode and the first learning mode, to the input device 40. The control device 20 receives the command and starts control in which the first learning mode is executed while the manual operation mode is executed. The process in step S206 is executed when the user P determines that further grinding on the grinding target region WA is required.

Next, in step S207, the control device 20 causes the imaging device 30 to take a moving image of the grinding target region WA, and presents the moving image to the user P via the presentation device 50. The control device 20 continues to present the moving image until the grinding work becomes completed. Furthermore, the control device 20 acquires an image of one frame from the moving image.

Next, in step S208, the control device 20 processes the acquired image, thereby generating three-dimensional image data of the image. The control device 20 stores the three-dimensional image data as the learning data 20*ra* in the third storage unit 20*r*. In addition, the control device 20 may generate a distance image by using the three-dimensional image data and cause the presentation device 50 to present the distance image.

Figure 12:
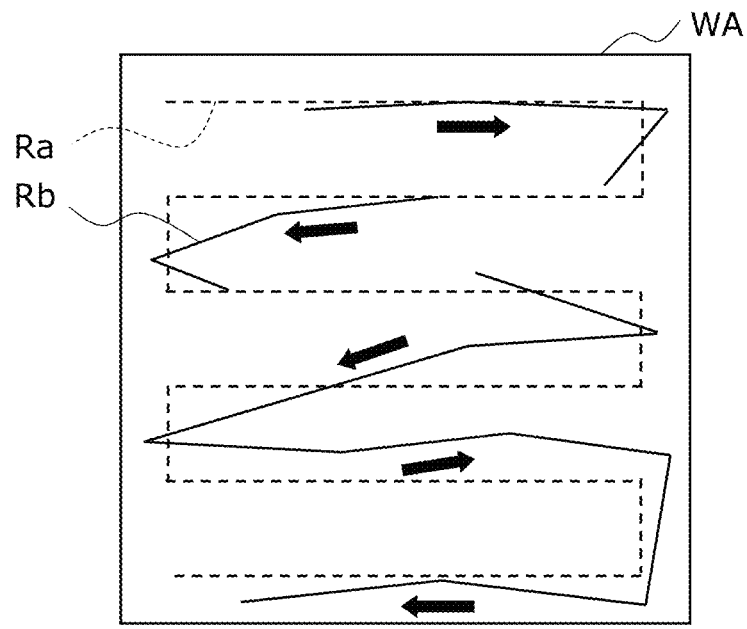
FIG. 12 is a diagram showing an example of a result of grinding work on the grinding target region by the robot according to manipulation information.

Next, in step S209, the control device 20 causes the robot 10 to execute grinding on the grinding target region WA by manual operation according to manipulation information inputted to the operation device 400 by the user P. For example, as shown in FIG. 12, the control device 20 controls the robot 10 according to the manipulation information so as to move the grinding device 11*a* along a path Rb (shown by a solid line) in the directions of black arrows on the grinding target region WA while pressing the grinding stone 11*b* against the surface of the grinding target region WA. FIG. 12 is a diagram showing an example of the result of the grinding work on the grinding target region WA by the robot 10 according to the manipulation information.

Next, in step S210, during execution of grinding, the control device 20 acquires operation data corresponding to a manual operation command generated according to the manipulation information, and stores the operation data as the learning data 20*ra* in the third storage unit 20*r* in association with the three-dimensional image data in step S208.

Next, in step S211, the control device 20 determines whether or not a command to end the grinding work has been inputted to the input device 40 by the user P. When such a command has been inputted (Yes in step S211), the control device 20 proceeds to step S213. When such a command has not been inputted (No in step S211), the control device 20 proceeds to step S212.

In step S212, the control device 20 determines whether or not the next image acquiring timing has been reached. The acquiring timing is the timing at which one sampling period elapses after the image of one frame is acquired. When the acquiring timing has been reached (Yes in step S212), the control device 20 proceeds to step S207 and repeats the processes in step S207 and the subsequent steps. When the acquiring timing has not been reached (No in step S212), the control device 20 returns to step S209.

In step S213, the control device 20 ends the manual operation mode. Furthermore, the control device 20 causes the learning model 20*qa* to perform machine learning with the three-dimensional image data of the learning data 20*ra* as input data and with the operation data, which is associated with the three-dimensional image data, as teacher data, and ends the first learning mode. The machine learning by the learning model 20*qa* may be performed at any time.

By executing the processes in steps S201 to S213, the control device 20 can cause the learning model 20*qa* to perform machine learning of a grinding work technique by manual operation of the user P. For example, the control device 20 can cause the learning model 20*qa* to perform machine learning of grinding work contents by manual operation on the entire path Rb in FIG. 12.

The first learning mode can be applied to the manual operation mode (for example, finish grinding) on a grinding work region after the end of grinding work (for example, rough cutting work) according to teaching data in the first autonomous operation mode. Alternatively, the first learning mode can be applied to the manual operation mode (for example, finish or repair grinding) on a grinding work region after the end of grinding work using the learning model 20*qa* in the second autonomous operation mode. Still alternatively, the first learning mode can be applied to the manual operation mode (for example, finish or repair grinding) on a grinding work region after the end of grinding work in the manual operation mode. Still alternatively, the first learning mode can be applied to the manual operation mode on an unground grinding work region.

[Second Learning Mode]

Figure 13:
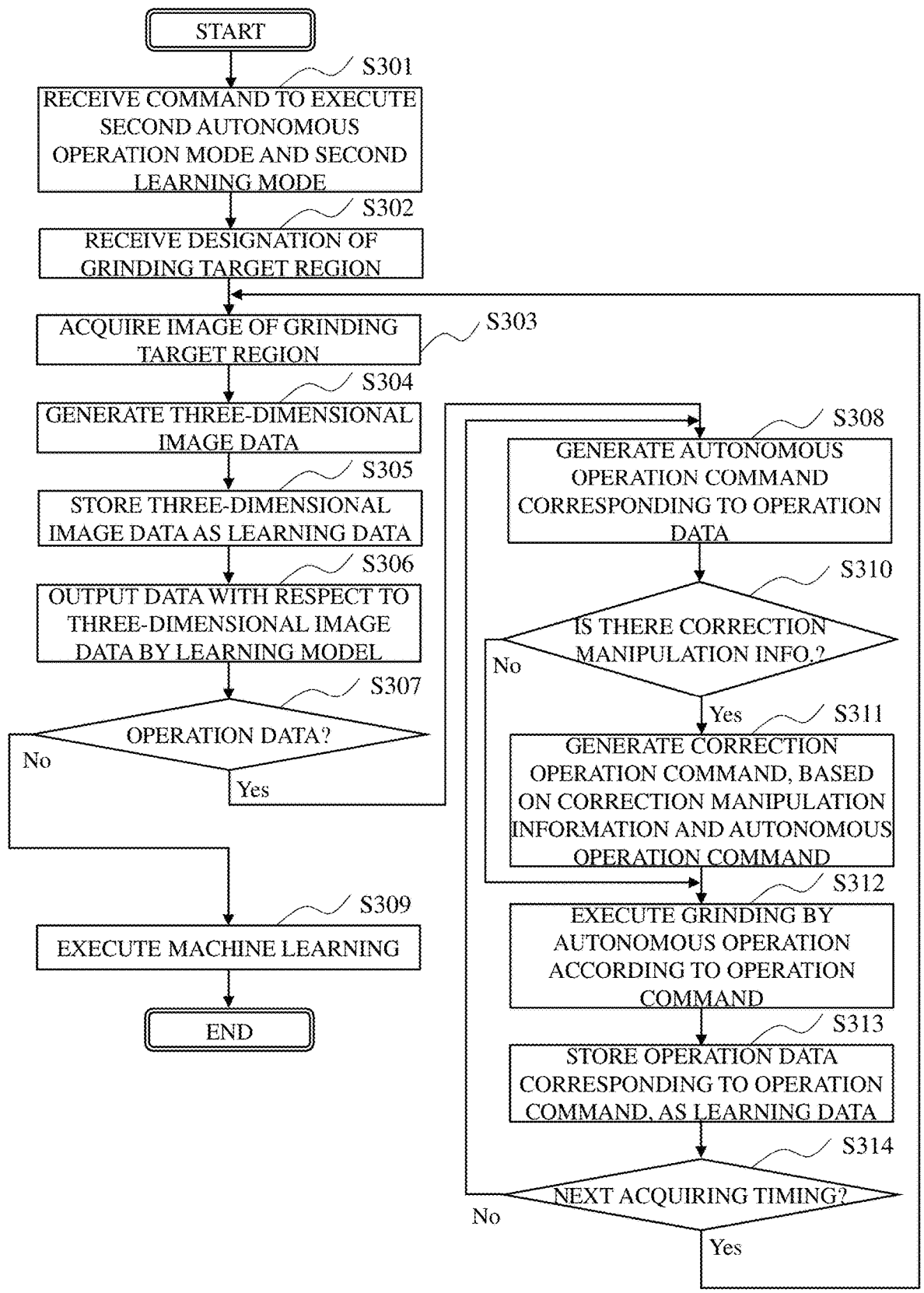
FIG. 13 is a flowchart showing an example of the operation in a second learning mode of the robot system according to the embodiment.

FIG. 13 is a flowchart showing an example of the operation in the second learning mode of the robot system 1 according to the embodiment. FIG. 13 shows an example in which the second learning mode is executed together with the second autonomous operation mode on the grinding target region WA.

As shown in FIG. 13, first, in step S301, the control device 20 receives a command to execute the second autonomous operation mode and the second learning mode which is inputted by the user P, and starts control in which the second learning mode is executed while the second autonomous operation mode is executed. In this case, during operation of the robot 10 by autonomous operation, the control device 20 receives input of a manipulation via the operation device 400, and corrects the operation of the robot 10 according to the manipulation information.

Next, in step S302, the control device 20 receives designation of the grinding target region WA which is inputted to the input device 40.

Next, in step S303, the control device 20 controls the robot 10 to cause the imaging device 30 to take a moving image of the grinding target region WA. The control device 20 presents the moving image to the user P via the presentation device 50 until the grinding work becomes completed. Furthermore, the control device 20 acquires an image of one frame from the moving image.

Next, in step S304, the control device 20 processes the acquired image, thereby generating three-dimensional image data of the image. Next, in step S305, the control device 20 stores the three-dimensional image data as the learning data 20*ra* in the third storage unit 20*r*. Next, in step S306, the control device 20 inputs the three-dimensional image data to the learning model 20*qa*, and causes the learning model 20*qa* to output data with respect to the three-dimensional image data.

Next, in step S307, the control device 20 determines whether or not the outputted data is operation data of the robot 10. When the outputted data is operation data of the robot 10 (Yes in step S307), the control device 20 proceeds to step S308. When the outputted data is not operation data of the robot 10 (No in step S307), the control device 20 proceeds to step S309.

In step S308, the control device 20 generates an autonomous operation command corresponding to the operation data outputted in step S306.

Next, in step S310, the control device 20 determines whether or not correction manipulation information has been outputted from the operation device 400. The correction manipulation information is manipulation information corresponding to a correction manipulation inputted to the operation device 400 by the user P in order to correct the operation of the robot 10. When correction manipulation information has been outputted (Yes in step S310), the control device 20 proceeds to step S311. When correction manipulation information has not been outputted (No in step S310), the control device 20 proceeds to step S312.

In step S311, the control device 20 generates a manual operation command corresponding to the correction manipulation information, and further generates a correction operation command, which is a new operation command, based on the manual operation command and the autonomous operation command in step S308. For example, the control device 20 may generate a correction operation command by replacing the autonomous operation command with the manual operation command or adding the manual operation command to the autonomous operation command.

In step S312, the control device 20 causes the robot 10 to execute grinding on the grinding target region WA by autonomous operation according to the autonomous operation command in step S308 or the correction operation command in step S311.

Next, in step S313, the control device 20 acquires operation data corresponding to the autonomous operation command or the correction operation command, and stores the operation data as the learning data 20*ra* in the third storage unit 20*r* in association with the three-dimensional image data in step S305.

Next, in step S314, the control device 20 determines whether or not the next image acquiring timing has been reached. When the acquiring timing has been reached (Yes in step S314), the control device 20 proceeds to step S303 and repeats the processes in step S303 and the subsequent steps. When the acquiring timing has not been reached (No in step S314), the control device 20 returns to step S308.

In step S309, the control device 20 ends the grinding work in the second autonomous operation mode. Furthermore, similar to step S213 in the first learning mode, the control device 20 causes the learning model 20*qa* to perform machine learning by using the learning data 20*ra* stored in the third storage unit 20*r*, and ends the second learning mode. The machine learning may be performed at any time.

By executing the processes in steps S301 to S314, the control device 20 can cause the learning model 20*qa* to perform machine learning of the correction manipulation of the user P added to the operation of the robot 10 in autonomous operation. Then, the second learning mode can be applied to the case that correction with a manual operation for the operation of the robot 10 in autonomous operation is possible in the first autonomous operation mode and the second operation mode.

Other Embodiments

Although the examples of the embodiment of the present disclosure have been described above, the present disclosure is not limited to the above embodiment. That is, various modifications and improvements may be made within the scope of the present disclosure. For example, modes in which various modifications are applied to the embodiment and modes constructed by combining the components in different embodiments are also included within the scope of the present disclosure.

For example, the control device 20 according to the embodiment is configured to be operable in each of the manual operation mode, the first autonomous operation mode, the second autonomous operation mode, the first learning mode, and the second learning mode, but may be configured to be operable in some of these modes. For example, the control device 20 may be configured to be operable in only either the first learning mode or the second learning mode.

Moreover, the control device 20 according to the embodiment is configured to accumulate the three-dimensional image data and the operation data that are acquired at each sampling period Ts, as the learning data 20*ra* in the first and second learning modes, and to generate an operation correspondence command by using the three-dimensional image data acquired at each sampling period Ts in the second autonomous operation mode. The length of the sampling period Ts may be determined so as to correspond to the ability of the learning model 20*qa*. As the sampling period Ts is longer, the control device 20 can reduce the number of times an image of the grinding target region WA is taken. Accordingly, the quantity of processing for generating three-dimensional image data can be reduced and the processing speed can be improved.

In the control device 20 according to the embodiment, the first image processing unit 20*d* executes image processing to obtain three-dimensional image data, and the learning model 20*qa* receives the three-dimensional image data as input data, but the control device 20 is not limited thereto. For example, the learning model 20*qa* may have a function to perform image processing on image data taken by the camera 31 to obtain three-dimensional image data. In this case, the learning model 20*qa* receives image data taken by the camera 31, as input data, and outputs operation data as output data.

In the robot system 1 according to the embodiment, vibration and impact transmitted from the grinding device 11*a* to the robot arm 12 are physically damped or reduced by the cushioning members 11*d* each of which is an example of a physical filter, but the robot system 1 is not limited thereto. For example, the vibration and the impact may be damped or reduced by an electrical filter. Specifically, a circuit including a low pass filter for eliminating the high-frequency components of the detection signals of the force sensor 11*e* of the end effector 11, or the like, may be provided. Alternatively, a circuit for operating each motor 404 so as to cancel out vibration and impact may be provided. The circuit is an example of the electrical filter, and may be provided to the control device 20, or may be provided to the operation device 400.

The control device 20 according to the embodiment is configured to receive execution of the manual operation mode on one grinding target region WA after the end of grinding work in the first or second autonomous operation mode on the grinding target region WA, but is not limited thereto. For example, the control device 20 may be configured to receive execution of the manual operation mode on each grinding target region WA after grinding work in the first or second autonomous operation mode is executed on all grinding target regions WA in a grinding target group which is one group including the grinding target regions WA. In this case, the control device 20 may be configured to cause the imaging device 30 to take images of all the grinding target regions WA and cause the presentation device 50 to present the images after the grinding work in the first or second autonomous operation mode on all the grinding target regions WA is completed. Accordingly, the user is allowed to check the results of grinding on all the grinding target regions WA while comparing the results with each other, and easily determine whether or not additional grinding work on each grinding target region WA is required.

Figure 14:
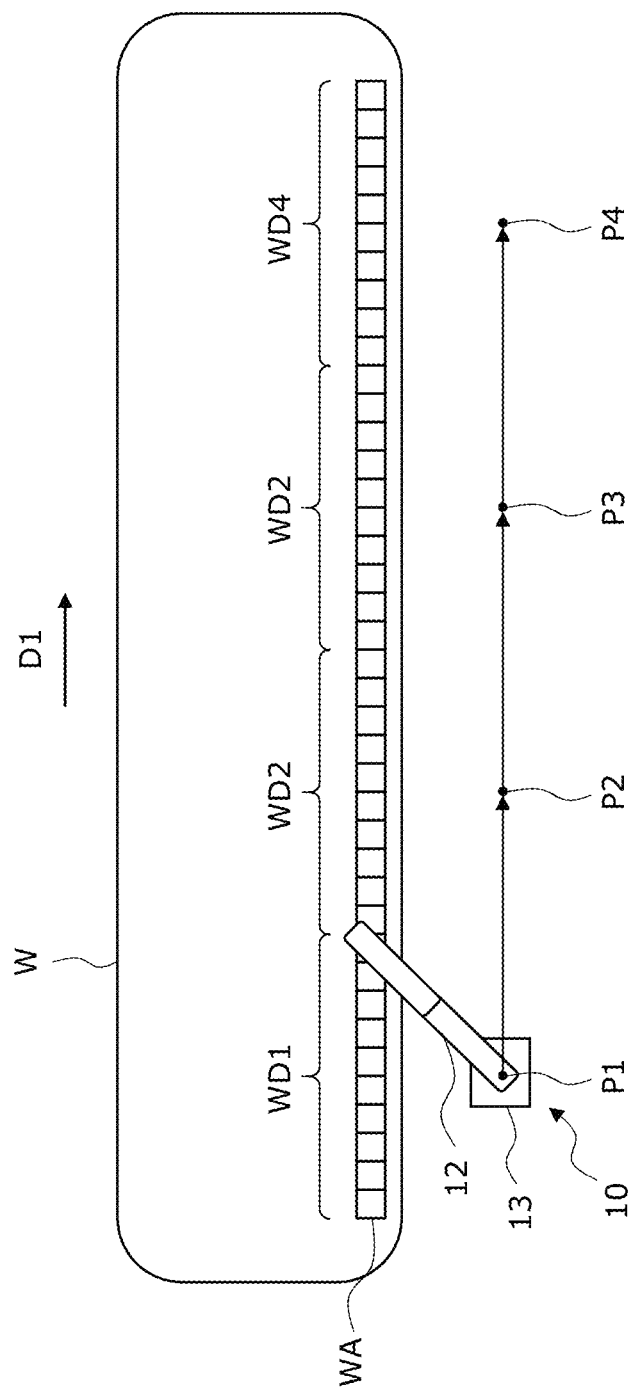
FIG. 14 is a plan view showing an example of an object including grinding target regions.

The control device 20 may be configured to perform grinding work on grinding target regions WA while moving the position of the robot 10. For example, as shown in FIG. 14, the control device 20 may be configured to divide the grinding target regions WA into grinding target sections WD1 to WD4 and perform processing on the grinding target sections WD1 to WD4. FIG. 14 is a plan view showing an example of an object W including grinding target regions WA. In FIG. 14, the object W is a cylindrical large-sized tank, and the grinding target regions WA are a welded portion extending in the axial direction of the large-sized tank W. The grinding target regions WA are each a region formed so as to have a predetermined shape and size by dividing the welded portion, and are arranged in a line in a direction D1 which is the axial direction of the large-sized tank W. The grinding target sections WD1 to WD4 each include at least one grinding target region WA. The grinding target sections WD1 to WD4 are arranged in the direction D1, and the size of the range of each of the grinding target sections WD1 to WD4 is equal to or smaller than the operating range of the robot arm 12. For example, the control device 20 may be configured to cause the transfer device 13 to move the robot 10 such that the robot 10 grinds the grinding target sections WD1 to WD4 in this order. The control device 20 causes the robot 10 located at a position P1 in front of the grinding target section WD1 to complete grinding work on all the grinding target regions WA in the grinding target section WD1, then moves the robot 10 to a position P2 in front of the adjacent grinding target section WD2, and causes the robot 10 to execute grinding on the grinding target regions WA in the grinding target section WD2. The same applies to grinding on the grinding target sections WD3 and WD4. Accordingly, it is possible to reduce the number of times the processing for moving the robot 10 is performed.

The learning model 20aa according to the embodiment may include one or more learning models. For example, the learning model 20qa may include various learning models generated so as to correspond to the kind of the object to be ground, the material of the object to be ground, the surface shape of the object to be ground, the type and the ability of the grinding device 11a, the kind of a grinding part such as the grinding stone 11b of the grinding device 11a, the shape and the dimensions of the grinding target region, the state of the grinding target region such as a welding mark, etc. The control device 20 may be configured to determine an appropriate learning model, based on information on the object to be ground, the grinding target region, the grinding device, the grinding part, etc., which is inputted via the input device 40, and to generate an autonomous operation command by using the learning model.

The control device 20 according to the embodiment may be configured to determine a first coordinate system relationship between a robot coordinate system set for the robot 10 and an object coordinate system set for the grinding target region WA, and to determine a second coordinate system relationship between a manipulation coordinate system set for the input device 40 and the object coordinate system. In addition, the control device 20 may be configured to generate a manual operation command according to the manipulation information of the input device 40, the first coordinate system relationship, and the second coordinate system relationship. Furthermore, the control device 20 may be configured to, when the object coordinate system is moved, newly determine a first coordinate system relationship after movement, based on the object coordinate system after movement and the robot coordinate system, and determine a relationship which is the same as the second coordinate system relationship before movement, as a second coordinate system relationship after movement between the object coordinate system after movement and the manipulation coordinate system.

Figure 15:
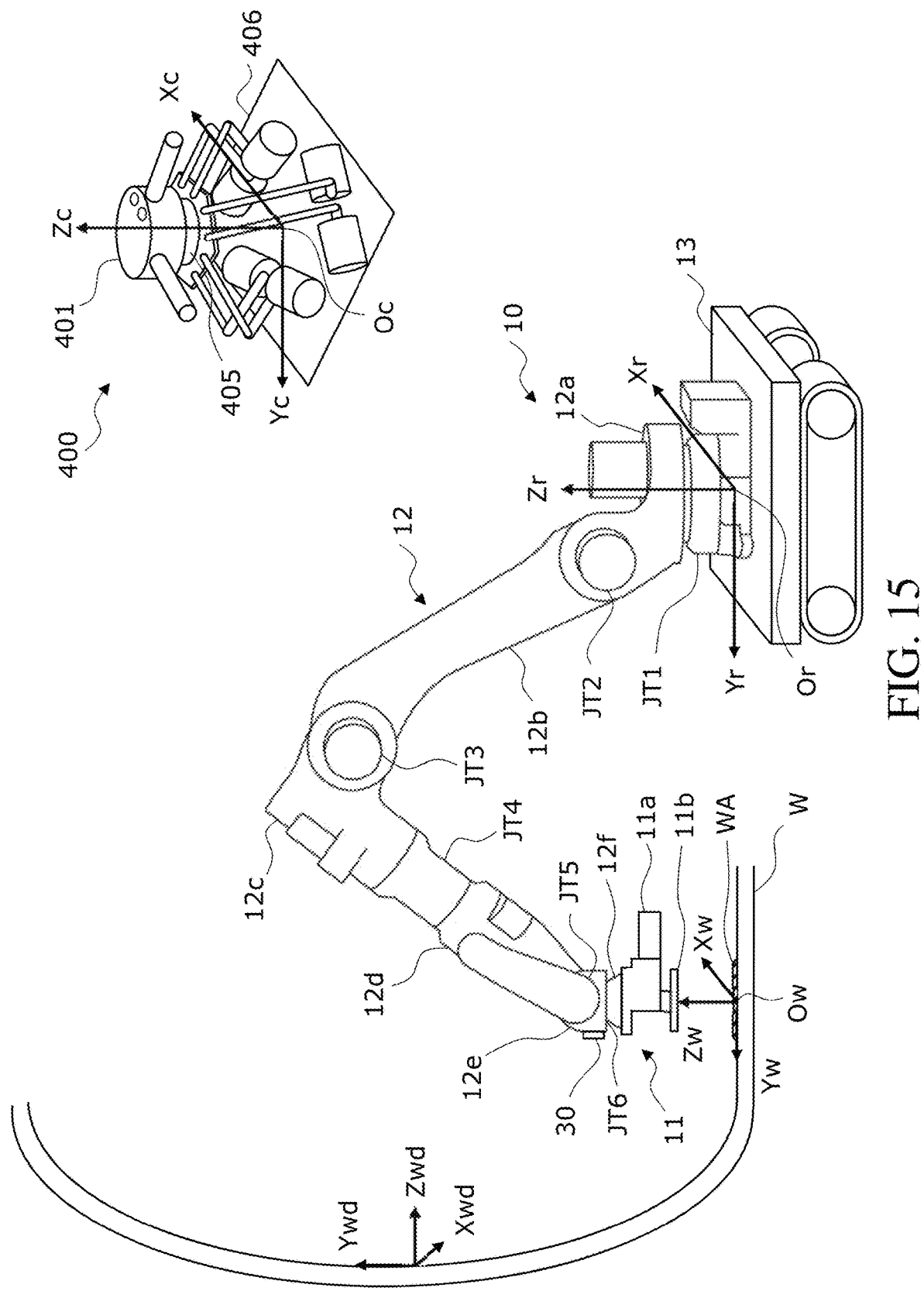
FIG. 15 is a diagram showing an example of each coordinate system in the robot system in FIG. 1.

For example, as shown in FIG. 15, a robot coordinate system Cr, an object coordinate system Cw, and a manipulation coordinate system Cc can be set. FIG. 15 is a diagram showing an example of each coordinate system in the robot system 1 in FIG. 1. The robot coordinate system Cr is a coordinate system based on the robot 10, and is defined by an Xr axis, a Yr axis, and a Zr axis which are orthogonal to each other, and an origin Or of these axes. The object coordinate system Cw is a coordinate system based on the grinding target region WA, and is defined by an Xw axis, a Yw axis, and a Zw axis which are orthogonal to each other, and an origin Ow of these axes. The manipulation coordinate system Cc is a coordinate system based on the operation device 400 of the input device 40, and is defined by an Xc axis, a Yc axis, and a Zc axis which are orthogonal to each other, and an origin Oc of these axes. For example, direction vectors of the Xr axis, the Yr axis, and the Zr axis and the position of the origin Or are defined by using a world coordinate system. Direction vectors of the Xw axis, the Yw axis, and the Zw axis and the position of the origin Ow are defined by using the world coordinate system. The world coordinate system is a coordinate system set in the space in which the robot system 1 is disposed.

For example, the first coordinate system relationship may be a relationship in position and posture between the robot coordinate system Cr and the object coordinate system Cw. For example, the relationship may be a relationship in the position and the posture of each coordinate axis. The relationship in the position and the posture of each coordinate axis may be a relationship based on the world coordinate system, or may be a relationship based on the robot coordinate system Cr.

The second coordinate system relationship may be a correspondence relationship in coordinates between the manipulation coordinate system Cc and the object coordinate system Cw. The correspondence relationship in coordinates may be a correspondence relationship in coordinate axis such as a correspondence relationship between the coordinate axes of the manipulation coordinate system Cc and the coordinate axes of the object coordinate system Cw, or may be a correspondence relationship in coordinate point between the manipulation coordinate system Cc and the object coordinate system Cw. For example, the Xc axis, the Yc axis, and the Zc axis of the manipulation coordinate system Cc may correspond to the Xw axis, the Yw axis, and the Zw axis of the object coordinate system Cw, respectively, may correspond to the Xw axis, the Yw axis, and the Zw axis in a different combination therefrom, or may correspond to axes in the object coordinate system Cw other than the Xw axis, the Yw axis, and the Zw axis.

For example, when the present object coordinate system Cw is moved, the control device 20 determines a relationship between an object coordinate system Cwd after movement and the robot coordinate system Cr as a new first coordinate system relationship, based on a relationship in position and posture between the object coordinate system Cwd after movement and the robot coordinate system Cr. The object coordinate system Cwd is defined by an Xwd axis, a Ywd axis, and a Zwd axis. For example, as for the first coordinate system relationship, the control device 20 defines "Cw=M1p·Cr" as an expression indicating the present relationship, calculates a function "M1p", defines "Cwd=M1d·Cr" as an expression indicating a new relationship, calculates a function "M1d", and replaces the relationship expression, thereby updating the first coordinate system relationship. For example, the functions "M1d" and "M1p" may be coordinate transformation functions that translate and/or rotate a coordinate axis.

Therefore, when the object coordinate system Cw is moved to be the object coordinate system Cwd, the control device 20 determines a relationship between the object coordinate system Cwd after movement and the robot coordinate system Cr as a first coordinate system relationship.

Moreover, when the present object coordinate system Cw is moved, the control device 20 determines a relationship between the object coordinate system Cwd after movement and the manipulation coordinate system Cc, which is the same relationship as the relationship between the present object coordinate system Cw and the manipulation coordinate system Cc, as a new second coordinate system relationship. For example, the control device 20 may determine a correspondence relationship in coordinate axis and/or coordinate point between the new object coordinate system Cwd and the manipulation coordinate system Cc, which is the same relationship as the correspondence relationship in coordinate axis and/or coordinate point between the present object coordinate system Cw and the manipulation coordinate system Cc, as a new second coordinate system relationship.

For example, as for the second coordinate system relationship, the control device 20 defines "Cw=M2·Cc" as an expression indicating the present relationship, defines "Cwd=M2·Cc" as an expression indicating a new relationship, and replaces the relationship expression, thereby updating the second coordinate system relationship. For example, a function "M2" may be a function that performs multiplication by a constant in each coordinate axis direction.

Therefore, when the object coordinate system Cw is moved to be the object coordinate system Cwd, the control device 20 maintains the second coordinate system relationship before and after movement.

When generating a manual operation command, the control device 20 calculates a relationship expression "Cr=M1d$^{-1}$M2·Cc" by using the relationship expression "Cwd=M1d·Cr" and the relationship expression "Cwd=M2·Cc", and inputs the manipulation information, etc., to the relationship expression "Cr=M1d$^{-1}$M2·Cc", thereby generating the manual operation command.

Therefore, when the user P applies a force to, for example, the grip unit 401 in the operation device 400 in the Yc axis positive direction, the control device 20 causes the robot 10 to move the end effector 11 in the Yw axis positive direction in the object coordinate system Cw before movement, and causes the robot 10 to move the end effector 11 in the Ywd axis positive direction in the object coordinate system Cwd after movement. Therefore, even when the position and/or the posture of the grinding target region WA is changed, the user P is allowed to manipulate the operation device 400 without greatly changing user P's own posture.

The technology of the present disclosure may be a control method. For example, a control method according to an aspect of the present disclosure includes: causing a learning model to receive image data of a grinding target portion as input data and to output an operation correspondence command for a robot as output data; generating an autonomous operation command for causing the robot to autonomously grind the grinding target portion, based on the operation correspondence command; generating a manual operation command for causing the robot to grind the grinding target portion according to manipulation information outputted from an operation device for operating the robot; controlling operation of grinding work of the robot according to the operation command; and causing the learning model to perform machine learning by using the image data of the grinding target portion and operation data of the robot corresponding to the operation command generated for the grinding target portion in a state of the image data, and the operation correspondence command outputted by the learning model is a command corresponding to the operation data of the robot. With the control method, the same effects as those of the above robot system, etc., are achieved. Such a control method may be realized by a circuit such as a CPU or LSI, an IC card, a single module, or the like.

Moreover, the technology of the present disclosure may be a program for executing the above control method, or may be a non-transitory computer-readable recording medium having the program recorded therein. In addition, it is needless to say that the above program can be distributed via a transmission medium such as the Internet.

The numbers such as the ordinal number and the quantities used above are all examples for specifically describing the technology of the present disclosure, and the present disclosure is not limited to the exemplified numbers. The connection relationship between the components is exemplified for specifically describing the technology of the present disclosure, and the connection relationship that realizes the function of the present disclosure is not limited thereto.

The division of blocks in the functional block diagram is an example, and blocks may be realized as one block, one block may be divided into blocks, and/or some functions may be transferred to another block. The functions of blocks having similar functions may be processed by single hardware or software in parallel or in a time division manner.

The invention claimed is:

1. A control device for a robot that performs grinding work by using a grinder, the control device comprising:
   autonomous command generation circuitry that generates an autonomous operation command for causing the robot to autonomously grind a grinding target portion;
   manual command generation circuitry that generates a manual operation command for causing the robot to grind a grinding target portion according to manipulation information outputted from an user interface for operating the robot;

operation control circuitry that controls operation of the grinding work of the robot according to the operation command;

storage that stores image data of a grinding target portion and operation data of the robot corresponding to the operation command generated for the grinding target portion in a state of the image data; and learning circuitry that performs machine learning by using image information that is information regarding image data of a grinding target portion and the operation data of the robot for the grinding target portion in a state of the image information, receives the image information of a grinding target portion as input data, and outputs an operation correspondence command corresponding to the operation data of the robot for the grinding target portion in a state of the image information as output data, wherein;

the operation correspondence command is a command including:
- a force command that commands magnitude and a direction of force that is applied to a grinding target portion from the grinder by the robot, and
- a position command that commands a three-dimensional position and three-dimensional posture of the grinder which are realized by the robot, and the autonomous command generation circuitry generates the autonomous operation command, based on the operation correspondence command of the learning circuitry.

2. The control device according to claim 1, wherein:
the learning circuitry performs machine learning by using the image information of a grinding target portion and the operation data of the robot corresponding to the manual operation command generated for the grinding target portion in a state of the image information.

3. The control device according to claim 1, wherein;
the learning circuitry performs machine learning by using the image information of a grinding target portion and the operation data of the robot corresponding to the autonomous operation command and the manual operation command that are generated for the grinding target portion in a state of the image information.

4. The control device according to claim 1, wherein:
during operation of the robot according to the autonomous operation command, the manual command generation circuitry receives input of correction manipulation information that is the manipulation information for correcting the operation of the robot, via the user interface, and generates a correction manual operation command that is the manual operation command, according to the correction manipulation information, and the learning circuitry performs machine learning by using the image information of a grinding target portion and the operation data of the robot corresponding to the autonomous operation command and the manual operation command that are generated for the grinding target portion in a state of the image information.

5. The control device according to claim 1, wherein:
the autonomous command generation circuitry generates:
- a first autonomous operation command that is the autonomous operation command for first grinding work in which the robot autonomously grinds a grinding target portion according to a predetermined operation procedure, and
- a second autonomous operation command that is the autonomous operation command for second grinding work in which the robot autonomously grinds the grinding target portion, based on the operation correspondence command of the learning circuitry after the first grinding work, and the autonomous command generation circuitry generates the second autonomous operation command, based on the operation correspondence command outputted by the learning circuitry with the image information of the grinding target portion as input data.

6. The control device according to claim 1, wherein;
the autonomous command generation circuitry generates a third autonomous operation command that is the autonomous operation command for third grinding work in which an unground grinding target portion is autonomously ground, and the autonomous command generation circuitry generates the third autonomous operation command, based on the operation correspondence command outputted by the learning circuitry with the image information of the grinding target portion as input data.

7. The control device according to claim 1, wherein the learning circuitry performs machine learning and input/output by using a learning model including a neural network.

8. The control device according to claim 1, wherein the learning circuitry uses data representing three-dimensional positions of various portions on a grinding target portion, as the image information.

9. The control device according to claim 8, further comprising:
first image processing circuitry that detects three-dimensional positions of various portions on a grinding target portion by processing an image of the grinding target portion, and generates image data representing the three-dimensional positions of said various portions.

10. The control device according to claim 1, further comprising:
first image processing circuitry that, based on at least either one of a shade or a hue represented in an image of a grinding target portion taken by using an imager including a non-reflective light source and a camera, detects a distance from the camera to various positions on the grinding target portion, and generates image data representing the distance to said various positions.

11. The control device according to claim 1, further comprising:
imaging control circuitry that controls operation of an imager that takes an image of a grinding target portion, and acquires image data of the grinding target portion, wherein:
the imaging control circuitry causes the imager to take an image of a grinding target portion at a timing before grinding work on the grinding target portion and a predetermined timing during the grinding work, and the learning circuitry outputs the operation correspondence command with the image information regarding the image data acquired by the imaging control circuitry as input data.

12. The control device according to claim 11, wherein:
the operation control circuitry causes the robot to grind all grinding target portions of a grinding target group including the grinding target portions according to the autonomous operation command, the imaging control circuitry causes the imager to take images of said all grinding target portions after grinding work according to the autonomous operation command on said all grinding target portions is completed, and the control device causes a display to present the images of said all grinding target portions.

13. The control device according to claim 11, further comprising:
   second image processing circuitry,
   wherein the second image processing circuitry processes image data of a grinding target portion taken by the imager, generates image data representing a three-dimensional shape of the grinding target portion by using at least either one of a color, a pattern, or a shade, and causes the display to present the image data.

14. The control device according to claim 1, further comprising:
   movement control circuitry that controls operation of a moving device that moves the robot,
   wherein the movement control circuitry causes the moving device to move the robot such that the robot grinds grinding target sections into which grinding target portions are divided, in a predetermined order.

15. The control device according to claim 1, wherein the control device performs to:
   receive, from a force sensor that detects a grinding reaction force that is a reaction force received by the grinder, information on the grinding reaction force; and
   cause the user interface to generate, as a manipulation reaction force that is a reaction force with respect to a manipulation inputted to the user interface, the manipulation reaction force corresponding to the grinding reaction force.

16. The control device according to claim 15, wherein the control device causes the user interface to generate the manipulation reaction force corresponding to the grinding reaction force acquired via a filter that reduces a high-frequency component of the grinding reaction force detected by the force sensor.

17. The control device according to claim 1, wherein;
   the manipulation information includes commands of a position, a posture, and a force inputted to the user interface, and
   the manual command generation circuitry generates the manual operation command including commands of a position, a posture, and an action force of the grinder that are increased from the commands of the position, the posture, and the force included in the manipulation information.

18. The control device according to claim 1, wherein;
   the control device performs to:
      determine a first coordinate system relationship that is a relationship between a robot coordinate system set for the robot and an object coordinate system set for the grinding target portion; and
      determine a second coordinate system relationship that is a relationship between a manipulation coordinate system set for the user interface and the object coordinate system, and
   the manual command generation circuitry generates the manual operation command according to the manipulation information, the first coordinate system relationship, and the second coordinate system relationship, and
   when the object coordinate system is moved, the control device newly determines the first coordinate system relationship after movement, based on the object coordinate system after movement and the robot coordinate system, and determines a relationship that is the same as the second coordinate system relationship before movement, as the second coordinate system relationship after movement between the object coordinate system after movement and the manipulation coordinate system.

19. A control system comprising:
   the control device according to claim 1; and
   the user interface for operating the robot.

20. A robot system comprising:
   the control device according to claim 1;
   the robot;
   the user interface for operating the robot; and
   an imager,
   wherein the imager outputs image data obtained by taking an image of a grinding target portion, to the control device.

21. The robot system according to claim 20, further comprising a display,
   wherein the display presents at least either an image taken by the imager or an image outputted from the control device, to a user of the robot system.

22. A control method comprising:
   causing a learning model to receive image data of a grinding target portion as input data and to output an operation correspondence command for a robot as output data;
   generating an autonomous operation command for causing the robot to autonomously grind the grinding target portion, based on the operation correspondence command;
   generating a manual operation command for causing the robot to grind the grinding target portion according to manipulation information outputted from an user interface for operating the robot;
   controlling operation of grinding work of the robot according to the operation command; and
   causing the learning model to perform machine learning by using the image data of the grinding target portion and operation data of the robot corresponding to the operation command generated for the grinding target portion in a state of the image data,
   wherein:
   the operation correspondence command outputted by the learning model is a command corresponding to the operation data of the robot; and
   the operation correspondence command outputted by the learning model is a command including:
      a force command that commands magnitude and a direction of force that is applied to a grinding target portion from the grinder by the robot and
      a position command that commands a three-dimensional position and three-dimensional posture of the grinder which are realized by the robot.

* * * * *